US012801387B2

(12) United States Patent
Constable

(10) Patent No.: US 12,801,387 B2
(45) Date of Patent: Nov. 17, 2026

(54) CIRCUITRY AND METHODS FOR IMPLEMENTING ONE OR MORE PREDICATED CAPABILITY INSTRUCTIONS

(71) Applicant: Intel Corporation, Santa Clara, CA (US)

(72) Inventor: Scott D. Constable, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/194,010

(22) Filed: Mar. 31, 2023

(65) Prior Publication Data

US 2024/0329995 A1 Oct. 3, 2024

(51) Int. Cl.

*G06F 9/30* (2018.01)
*G06F 11/10* (2006.01)
*G06F 12/14* (2006.01)

(52) U.S. Cl.

CPC ........ *G06F 9/3016* (2013.01); *G06F 9/30145* (2013.01); *G06F 11/1004* (2013.01); *G06F 12/1425* (2013.01); *G06F 2212/1052* (2013.01)

(58) Field of Classification Search

None
See application file for complete search history.

(56) References Cited

U.S. PATENT DOCUMENTS

2018/0089468 A1* 3/2018 Rozas ..................... G06F 21/78
2019/0012455 A1 1/2019 Barnes
2022/0058023 A1 2/2022 Lemay et al.
2022/0114102 A1 4/2022 Wang et al.

(Continued)

OTHER PUBLICATIONS

Carruth, C., "Speculative Load Hardening: A Spectre Variant #1 Mitigation Technique," Sep. 2018, 17 pages. [Online]. Available: https://llvm.org/docs/SpeculativeLoadHardening.html.

(Continued)

*Primary Examiner* — Michael Sun
(74) *Attorney, Agent, or Firm* — NICHOLSON DE VOS WEBSTER & ELLIOTT LLP

(57) ABSTRACT

Circuitry and methods for implementing one or more predicated capability instructions are described. In certain examples, a hardware processor (e.g., core) includes a capability management circuit to check a capability for a memory access request for a memory, the capability comprising an address field for an address to be accessed by the memory access request and a bounds field that is to indicate a lower bound and an upper bound of an address space to which the capability authorizes access; a decoder circuit to decode a single instruction into a decoded single instruction, the single instruction comprising a field to indicate the capability, and an opcode to indicate: an operation to be performed for the address, that an execution circuit is to perform a first check that a condition code, that indicates a status from a previous execution of the execution circuit, is a certain value, that the capability management circuit is to perform a second check that the capability authorizes access to the address, and in response to the first check and the second check both passing, cause the execution circuit to perform the operation for the address; and the execution circuit to execute the decoded single instruction according to the opcode.

20 Claims, 22 Drawing Sheets

(56) References Cited

U.S. PATENT DOCUMENTS

| | | | | |
|---|---|---|---|---|
| 2022/0197658 | A1 | 6/2022 | Agron | |
| 2023/0195360 | A1* | 6/2023 | LeMay | G06F 9/3818<br>711/154 |
| 2023/0315452 | A1* | 10/2023 | Constable | G06F 9/30047<br>712/207 |
| 2024/0086579 | A1* | 3/2024 | Ayrapetyan | G06F 21/52 |
| 2024/0111539 | A1 | 4/2024 | Agron et al. | |
| 2024/0289495 | A1* | 8/2024 | Asanovic | G06F 21/72 |

OTHER PUBLICATIONS

Cimpanu, C., "Chrome: 70% of All Security Bugs are Memory Safety Issues," ZDNet, May 22, 2020, 5 pages. [Online]. Available: https://www.zdnet.com/article/chrome-70-of-all-security-bugs-are-memory-safety-issues/.

Cimpanu, C., "Microsoft: 70 Percent of All Security Bugs are Memory Safety Issues," ZDNet, Feb. 11, 2019, 4 pages. [Online]. Available: https://www.zdnet.com/article/microsoft-70-percent-of-all-security-bugs-are-memory-safety-issues/.

Intel Corporation, "Bounds Check Bypass / CVE-2017-5753 / INTEL-SA-00088," Jan. 3, 2018, 5 pages. [Online]. Available: https://www.intel.com/content/www/us/en/developer/articles/technical/software-security-guidance/advisory-guidance/bounds-check-bypass.html.

Kirzner, O., et al., "An Analysis of Speculative Type Confusion Vulnerabilities in the Wild," in 30th USENIX Security Symposium (USENIX Security 21), Aug. 2021, 19 pages.

Watson, R. et al., "Capability Hardware Enhanced RISC Instructions (CHERI)", available online at <https://www.cl.cam.ac.uk/research/security/ctsrd/cheri/>, Dec. 2019, 2 pages.

Watson, R. et al., "Capability Hardware Enhanced RISC Instructions: CHERI Instruction-Set Architecture (Version 8)", University of Cambridge, Computer Laboratory, Technical Report, No. 951, Oct. 2020, 590 pages.

Notice of Allowance, U.S. Appl. No. 18/194,086, May 12, 2026, 8 pages.

Tice, Caroline et al., "Enforcing Forward-Edge Control-Flow Integrity in GCC & LLVM", 23rd USENIX Security Symposium, Aug. 2014, pp. 941-955.

* cited by examiner

CODE WITH A CONDITIONAL BRANCH 602

```
 CMP %r9, %r10
 JE .Block2
.Block1:
 ADD %r11, %r12
 JMP .Block3
.Block2:
 SUB %r13, %r12
.Block3:
 ...
```

CODE WITH IF-ELIMINATION USING CAPABILITY ARCHITECTURE 604

```
CMP %r9, %r10
ADD %r11, %r12, %r15, nf
SUB %r13, %r12, %r12, nf
CMOVNE %r15, %r12
```

FIG. 6

CAPABILITY CODE WITH A CONDITIONAL BRANCH 702

CAPABILITY CODE WITH IF-ELIMINATION 704

| CAPABILITY CODE WITH A CONDITIONAL BRANCH 702 | CAPABILITY CODE WITH IF-ELIMINATION 704 |
|---|---|
| CMP %r9, %r10 | CMP %r9, %r10 |
| JE .Block2 | ADD (%c11), %r12, %r14, nf |
| .Block1: | SUB (%c13), %r12, %r15, nf |
| ADD (%c11), %r12 | CMOVE %r15, %r14 |
| JMP .Block3 | MOV %r14, %r12 |
| .Block2: | |
| SUB (%c13), %r12 | |
| .Block3: | |
| … | |

FIG. 7

CIRCUITRY AND METHODS FOR IMPLEMENTING ONE OR MORE PREDICATED CAPABILITY INSTRUCTIONS

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF DRAWINGS

Various examples in accordance with the present disclosure will be described with reference to the drawings, in which:

FIG. 6 illustrates a comparison of code with a conditional branch against code that writes the same value to the register (r12) using if-elimination according to examples of the disclosure.

FIG. 7 illustrates a comparison of capability code with a conditional branch against capability code that writes the same value to the register (r12) using if-elimination according to examples of the disclosure.

DETAILED DESCRIPTION

Figure 1:
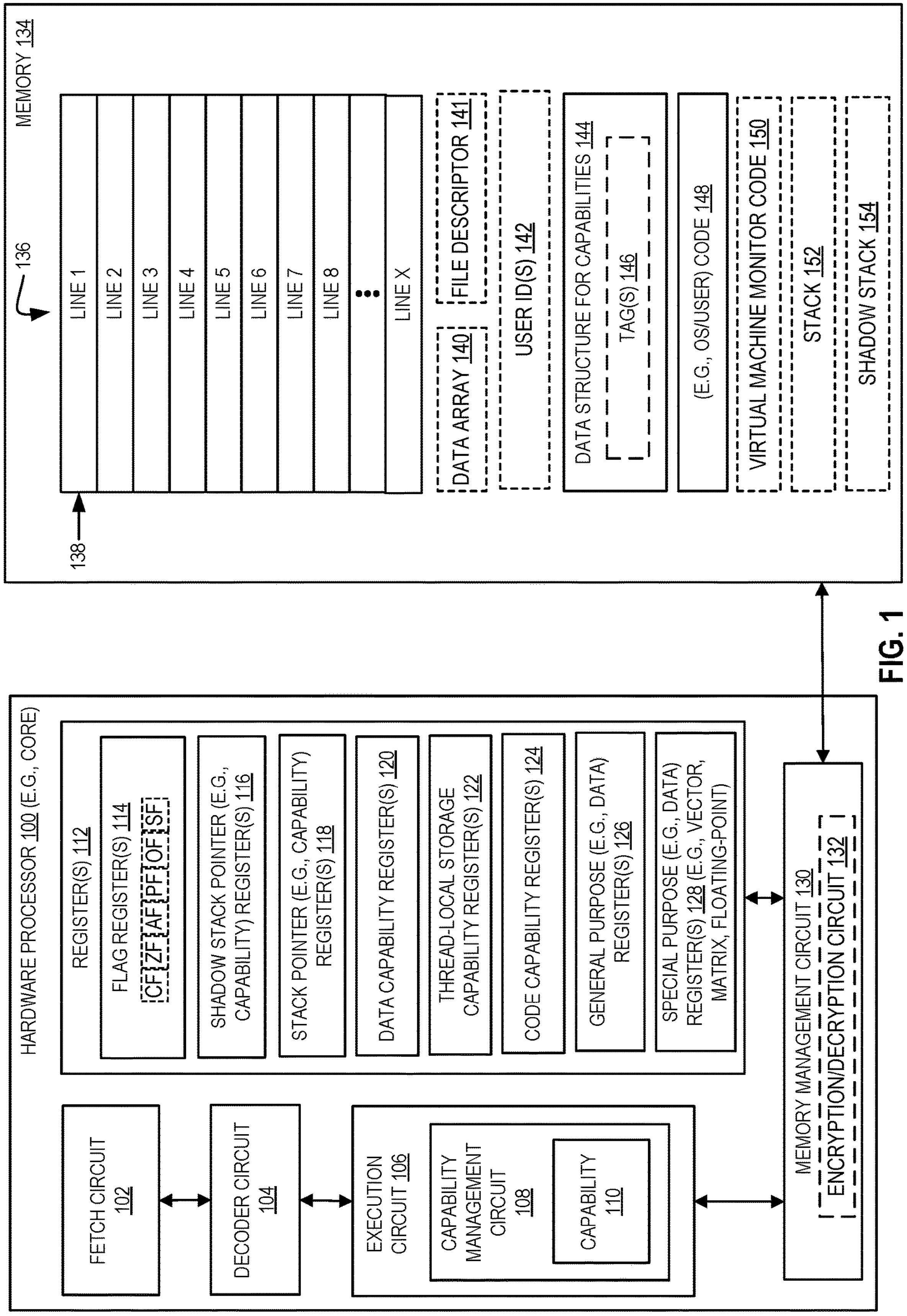
FIG. 1 illustrates a block diagram of a hardware processor including a capability management circuit and coupled to a memory according to examples of the disclosure.

The present disclosure relates to methods, apparatus, systems, and non-transitory computer-readable storage media for predicated capability instructions. According to some examples herein, one or more predicated capability instructions are used to enhance the performance and security of a processor.

Memory-safety and type-safety vulnerabilities continue to be pervasive for foundational software layers, including operating systems, the network stack, web browsers, and device drivers. By some estimates, around 70% of all security vulnerabilities continue to be memory-safety and type-safety vulnerabilities. One probable reason why is that the semantic gap between software and hardware has not been narrowed in certain ISAs.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Certain operations include accessing one or more memory locations, e.g., to store and/or read (e.g., load) data. In certain examples, a computer includes a hardware processor requesting access to (e.g., load or store) data and the memory is local (or remote) to the computer. A system may include a plurality of cores, for example, with a proper subset of cores in each socket of a plurality of sockets, e.g., of a system-on-a-chip (SoC). Each core (e.g., each processor or each socket) may access data storage (e.g., a memory). Memory may include volatile memory (e.g., dynamic random-access memory (DRAM)) or (e.g., byte-addressable) persistent (e.g., non-volatile) memory (e.g., non-volatile RAM) (e.g., separate from any system storage, such as, but not limited, separate from a hard disk drive). One example of persistent memory is a dual in-line memory module (DIMM) (e.g., a non-volatile DIMM), for example, accessible according to a Peripheral Component Interconnect Express (PCIe) standard.

Memory may be divided into separate blocks (e.g., one or more cache lines), for example, with each block managed as a unit for coherence purposes. In certain examples, a (e.g., data) pointer (e.g., an address) is a value that refers to (e.g., points to) the location of data, for example, a pointer may be an (e.g., virtual) address and that data is (or is to be) stored at that address (e.g., at the corresponding physical address).

In certain examples, memory is divided into multiple lines, e.g., and each line has its own (e.g., unique) address. For example, a line of memory may include storage for 512 bits, 256 bits, 128 bits, 64 bits, 32 bits, 16 bits, or 8 bits of data, or any other number of bits.

In certain examples, memory corruption (e.g., by an attacker) is caused by an out-of-bound access (e.g., memory access using the base address of a block of memory and an offset that exceeds the allocated size of the block) or by a dangling pointer (e.g., a pointer which referenced a block of memory (e.g., buffer) that has been de-allocated).

Certain examples herein utilize memory corruption detection (MCD) hardware and/or methods, for example, to prevent an out-of-bound access or an access with a dangling pointer. In certain examples, memory accesses are via a capability, e.g., instead of a pointer. In certain examples, the capability is a communicable (e.g., unforgeable) token of authority, e.g., through which programs access all memory and services within an address space. In certain examples, capabilities are a fundamental hardware type that are held in registers (e.g., where they can be inspected, manipulated, and dereferenced using capability instructions) or in memory (e.g., where their integrity is protected). In certain examples, the capability is a value that references an object along with an associated set of one or more access rights. In certain examples, a (e.g., user level) program on a capability-based operating system (OS) is to use a capability (e.g., provided to the program by the OS) to access a capability protected object.

In certain examples of a capability-based addressing scheme, (e.g., code and/or data) pointers are replaced by protected objects (e.g., "capabilities") that are created only through the use of privileged instructions, for example, which are executed only by either the kernel of the OS or some other privileged process authorized to do so, e.g., effectively allowing the kernel (e.g., supervisor level) to control which processes may access which objects in memory (e.g., without the need to use separate address spaces and therefore requiring a context switch for an access). Certain examples implement a capability-based addressing scheme by extending the data storage (for example, extending memory (e.g., and register) addressing) with an additional bit (e.g., writable only if permitted by the capability management circuit) that indicates that a particular location is protected and referenced by a capability, for example, such that all memory accesses (e.g., loads, stores, and/or instruction fetches) to the particular location must be authorized by the capability or be denied. Additionally or alternatively, certain examples implement capabilities by extending the data storage (for example, extending memory (e.g., and registers)) with an additional bit (e.g., writable only if permitted by the capability management circuit) that indicates the data storage stores a capability, for example, where a first capability (that protects a first memory location referenced by the first capability) is stored in a second memory location, and the second memory location is protected and referenced by a second capability. Example formats of capabilities are discussed below in reference to FIGS. 2A and 2B.

Thus, certain ISA designs may include more semantic information to become exposed to hardware. One example is where a capability is used to bounds-check pointers, e.g., as a primitive datatype recognized by the processor. Hence, the hardware can know when data (e.g., a 128-bit wide "word" of data) in memory corresponds to a pointer, and moreover the hardware can also know the memory bounds within which the pointer can access data. For background, FIG. 2B shows a (e.g., 128-bit) capability, which consists of an (e.g., 64-bit) address (e.g., pointer) combined with bounds information and other metadata that can be used for enforcing other fine-grained access control policies. In certain examples, each instance of a capability also has an associated (e.g., 1-bit) validity tag that is guarded within processor-protected memory, e.g., where this tag serves as a tamper-proof type of indicator that indicates that a given section (e.g., 128-bit word) in memory is a capability. In certain examples, capabilities are an extension to an instruction set to introduce operations that create and destroy capabilities, use capabilities to store and load data, manipulate capability permissions, etc.

Certain capability-based ISAs (e.g., cryptographic capability computing) use encrypted pointers to enforce fine-grained access control on objects in memory, e.g., where new instructions are used to construct and use these pointers (e.g., enforcing capability checks for memory access instructions).

Certain ISAs are according to a reduced instruction set computer (RISC) architecture, e.g., according to a RISC-V standard. Certain capabilities (e.g., according to a Capability Hardware Enhanced RISC Instructions (CHERI) standard) provide coarse-grained control-flow integrity (CFI), e.g., using capabilities to architecturally bound the scope of a function, library, software sandbox, subprocess, etc.

However, certain capability-based ISAs do not completely solve all issues arising from memory-safety and type-safety violations, or for access control in general. In certain examples, the technical issues and problems with certain capability-based ISAs are: (i) speculation vulnerabilities (for example, Spectre-like attacks) that can affect capability architectures, e.g., even when the capability instructions have been individually hardened against speculation vulnerabilities, (ii) that the width of an object type (otype) field (see object type field 110E in FIG. 2B) is constant and fixed by the ISA specification, e.g., does not scale for (e.g., extremely) granular access control, and (iii) certain ISA instructions that support capability dereferences are incompatible with (e.g., common) compiler optimizations such as, but not limited to, if-elimination. Solutions to these technical issues and problems are discussed below.

In certain examples, a RISC philosophy dictates that if capabilities are to be predicated on something (e.g., flag register), then the predicate check and subsequent capability invocation should be performed by separate instructions, e.g., with an interposed conditional branch (e.g., Jump if Condition Is Met instruction (Jcc instruction)). In certain examples, if (e.g., all or most) capabilities are predicated, then this causes significant code bloat, and thus imposes penalties for instruction caching, and introduces more processor pipeline flushes if conditional branches are used to implement the predicate checks. Moreover, in certain examples, misprediction of the conditional branches allows a capability to be misused by a malicious adversary during speculative execution.

Certain examples herein are directed to predicated capability instructions that overcome the above technical problems, e.g., where the capabilities are exposed through the ISA. Certain examples herein are directed to capability instructions that are predicated in the manner described herein. In certain examples, the capability instruction is predicated on a condition indicated by the instruction, for example, where the condition is a status from a previous execution of the execution circuit (e.g., in contrast to a data value from a register). In certain examples, the predicated capability instruction is not a conditionally move capability on zero (CMOVZ) instruction (e.g., where the condition of zero is merely checked against a data value set in a register (e.g., register "rt")) and/or is not a conditionally move capability on not-zero (CMOVNZ) instruction (e.g., where the condition of not-zero is merely checked against a data value set in a register (e.g., register "rt")). In certain examples, a status is a value (e.g., in a flag register) that is modified as an effect of one or more arithmetic and/or logical (e.g., bit manipulation) operations by the processor, e.g., and is not just a data value stored in a general-purpose register (e.g., a register separate from a flag register). In certain examples, the status value is set (e.g., automatically) based on the result of another operation (e.g., and is not the result itself), e.g., and thus is not modified directly by a user.

Certain examples herein introduce modifications to the behavior of instructions to allow actions performed via capabilities to be predicated on a condition, e.g., a condition dictated (e.g., indicated) by an opcode, opcode extension, operand, or instruction prefix. In certain examples, the predicate prevents the instruction from performing its operation(s) if the predicate is not satisfied when the instruction is executed. Certain examples herein are directed to methods that can prevent capabilities from being misused during speculation (e.g., to mitigate speculation vulnerabilities), and methods to enable performance optimizations. Certain examples herein are directed to predicated capability instructions that harden (e.g., critical) software against speculation vulnerabilities.

The instructions disclosed herein are improvements to the functioning of a processor (e.g., of a computer) itself because they implement the above functionality by electrically changing a general-purpose computer (e.g., the decoder circuit and/or the execution circuit thereof) by creating electrical paths within the computer (e.g., within the decoder circuit and/or the execution circuit thereof). These electrical paths create a special purpose machine for carrying out the particular functionality.

The instructions disclosed herein are improvements to the functioning of a processor (e.g., of a computer) itself. Instruction decode circuitry (e.g., decoder circuit 104) not having such an instruction as a part of its instruction set would not decode as discussed herein. An execution circuit (e.g., execution circuit 106) not having such an instruction as a part of its instruction set would not execute as discussed herein. For example, a predicated capability instruction. Examples herein are improvements to the functioning of a processor (e.g., of a computer) itself as they provide enhanced security (e.g., security hardening).

Turning now to the Figures, FIG. 1 illustrates a block diagram of a hardware processor 100 (e.g., core) including a capability management circuit 108 and coupled to a memory 134 according to examples of the disclosure. Although the capability management circuit 108 is depicted within the execution circuit 106, it should be understood that the capability management circuit can be located elsewhere, for example, in another component of hardware processor 100 (e.g., within fetch circuit 102) or separate from the depicted components of hardware processor 100.

Depicted hardware processor 100 includes a hardware fetch circuit 102 to fetch an instruction (e.g., from memory 134), e.g., an instruction that is to request access to a block (or blocks) of memory storing a capability (e.g., or a pointer) and/or an instruction that is to request access to a block (or blocks) of memory 134 through a capability 110 (e.g., or a pointer) to the block (or blocks) of the memory 134. Depicted hardware processor 100 includes a hardware decoder circuit 104 to decode an instruction, e.g., an instruction that is to request access to a block (or blocks) of memory storing a capability (e.g., or a pointer) and/or an instruction that is to request access to a block (or blocks) of memory 134 through a capability 110 (e.g., or a pointer) to the block (or blocks) of the memory 134. Depicted hardware execution circuit 106 is to execute the decoded instruction, e.g., an instruction that is to request access to a block (or blocks) of memory storing a capability (e.g., or a pointer) and/or an instruction that is to request access to a block (or blocks) of memory 134 through a capability 110 (e.g., or a pointer) to the block (or blocks) of the memory 134.

In certain examples, an instruction utilizes (e.g., takes as an operand) a capability 110 (e.g., an address and security metadata) to the address in memory 134 where a particular item is stored or is to be stored.

In certain examples, a predicated capability instruction is requested for execution, e.g., where the instruction includes a field to indicate a capability 110 (for example, a capability register name, e.g., a data capability register 120 or a code capability register 124), and an opcode to indicate: (1) an (e.g., predicated) operation to be performed for the address (or register) by execution circuit 106, (2) that execution circuit 106 is to perform a first check that a condition code (e.g., in flag register 114), that indicates a status from a previous execution of the execution circuit, is a certain value, (3) that the capability management circuit 108 is to perform a second check that the capability authorizes access to the address in memory 134 (or register), and (4) in response to the first check and the second check both passing, cause the execution circuit 106 to perform the operation for the address in memory 134 (or register).

In certain examples, capability management circuit 108 is to, in response to receiving a predicated capability instruction that is requested for fetch, decode, and/or execution, check if the instruction is a capability instruction or a non-capability instruction (e.g., a capability-unaware instruction), for example, and (i) if a capability instruction, is to allow access to memory 134 indicated by the capability (e.g., and in response to the predicated condition passing its respective check) and/or (ii) if a non-capability instruction, is not to allow access to memory 134 indicated by the capability. In certain examples, capability management circuit 108 is to check if an instruction is a capability instruction or a non-capability instruction by checking (i) a field (e.g., opcode) of the instruction (e.g., checking a corresponding bit or bits of the field that indicate if that instruction is a capability instruction or a non-capability instruction) and/or (ii) if a particular register is a "capability" type of register (e.g., instead of a general-purpose data register) (e.g., implying that certain register(s) are not to be used to store a capability or capabilities). In certain examples, capability management circuit 108 is to manage the capabilities, e.g., only the capability management circuit is to set and/or clear validity tags (e.g., in memory and/or in register(s)). In certain examples, capability management circuit 108 is to clear the validity tag of a capability in a register in response to that register being written to by a non-capability instruction.

In certain examples, the instruction is requested for execution by executing user code and/or OS code 148 (e.g., or some other privileged process authorized to do so). In certain examples, an instruction set architecture (ISA) includes one or more instructions for manipulating the bounds field, e.g., to set the lower bound and/or upper bound of an object.

In certain examples, the source storage location (e.g., virtual address) in memory 134 for state, data, and/or instructions (e.g., an object) protected by the metadata and/or bounds of the "capability with metadata and/or bounds" 110 is an operand of an (e.g., supervisor level or user level) instruction (e.g., microcode or micro-instruction) (e.g., having a mnemonic of LoadData) that is to load the state, data, and/or instructions (e.g., an object) protected by the metadata and/or bounds from the memory 134 into register(s) 112. In certain examples, the destination storage location (e.g., virtual address) in memory 134 for state, data, and/or instructions (e.g., an object) to-be-protected by the metadata and/or bounds of the "capability with metadata and/or bounds" 110 is an operand of an (e.g., supervisor level or user level) instruction (e.g., microcode or micro-instruction) (e.g., having a mnemonic of StoreData) that is to store the state, data, and/or instructions (e.g., an object) protected by the metadata and/or bounds from the register(s) 112 into memory 134. In certain examples, the instruction is requested for execution by executing user code and/or OS code 148 (e.g., or some other privileged process authorized to do so). In certain examples, an instruction set architecture (ISA) includes one or more instructions for manipulating the capability field(s) (e.g., the fields in FIGS. 2A-2B), e.g., to set the metadata and/or bound(s) of an object in memory.

In certain examples, capability management circuit 108 is to enforce security properties on changes to capability data (e.g., metadata), for example, for the execution of a single instruction, by enforcing: (i) provenance validity that ensures that valid capabilities can only be constructed by instructions that do so explicitly (e.g., not by byte manipulation) from other valid capabilities (e.g., with this property applying to capabilities in registers and in memory), (ii) capability monotonicity that ensures, when any instruction constructs a new capability (e.g., except in sealed capability manipulation and exception raising), it cannot exceed the permissions and bounds of the capability from which it was derived, and/or (iii) reachable capability monotonicity that ensures, in any execution of arbitrary code, until execution is yielded to another domain, the set of reachable capabilities (e.g., those accessible to the current program state via registers, memory, sealing, unsealing, and/or constructing sub-capabilities) cannot increase.

In certain examples, capability management circuit 108 (e.g., at boot time) provides initial capabilities to the firmware, allowing data access and instruction fetch across the full address space. Additionally, all tags are cleared in memory in certain examples. Further capabilities can then be derived (e.g., in accordance with the monotonicity property) as they are passed from firmware to boot loader, from boot loader to hypervisor, from hypervisor to the OS, and from the OS to the application. At each stage in the derivation chain, bounds and permissions may be restricted to further limit access. For example, the OS may assign capabilities for only a limited portion of the address space to the user software, preventing use of other portions of the address space. In certain examples, capabilities carry with them intentionality, e.g., when a process passes a capability as an argument to a system call, the OS kernel can use only that capability to ensure that it does not access other process memory that was not intended by the user process (e.g., even though the kernel may in fact have permission to access the entire address space through other capabilities it holds). In certain examples, this prevents "confused deputy" problems, e.g., in which a more privileged party uses an excess of privilege when acting on behalf of a less privileged party, performing operations that were not intended to be authorized. In certain examples, this prevents the kernel from overflowing the bounds on a user space buffer when a pointer to the buffer is passed as a system-call argument. In certain examples, these architectural properties of a capability management circuit 108 provide the foundation on which a capability-based OS, compiler, and runtime can implement a certain programming language (e.g., C and/or C++) language memory safety and compartmentalization.

In certain examples, the capability is stored in a single line of data. In certain examples, the capability is stored in multiple lines of data. For example, a block of memory may be lines 1 and 2 of data of the (e.g., physical) addressable memory 136 of memory 134 having an address 138 to one (e.g., the first) line (e.g., line 1). Certain examples have a memory of a total size X, where X is any positive integer. Although the addressable memory 136 is shown separate from certain regions (e.g., data array(s) 140, file descriptor(s) 141, and user ID(s) 142), it should be understood that those regions (e.g., data array(s) 140, file descriptor(s) 141, and user ID(s) 142) may be within addressable memory 136.

In certain examples, capabilities (e.g., one or more fields thereof) themselves are also stored in memory 134, for example, in data structure 144 (e.g., table) for capabilities. In certain examples, a (e.g., validity) tag 146 is stored in data structure 144 for a capability stored in memory. In certain examples, tags 146 (e.g., in data structure 144) are not accessible by non-capability (e.g., load and/or store) instructions. In certain examples, a (e.g., validity) tag is stored along with the capability stored in memory (e.g., in one contiguous block).

In certain examples, one or more data arrays 140 are stored in memory 134 (e.g., with a data array indicated (e.g., identified) by a capability 110 to the data array), e.g., as discussed in reference to FIG. 4 below.

In certain examples, one or more file descriptors 141 are stored in memory 134 (e.g., with a file descriptor indicated (e.g., identified) by a capability 110 to the file descriptor), e.g., as discussed in reference to FIG. 4 below. In certain examples, a file descriptor includes the information utilized to access a file, e.g., a pointer to the file, the access rights, the access modes (read or write), the current position in the file, etc.

In certain examples, one or more user identification ID) values 142 are stored in memory 134 (e.g., with a user ID value indicated (e.g., identified) by a capability 110 to the user ID), e.g., as discussed in reference to FIG. 5 below.

Depicted hardware processor 100 includes one or more registers 112, for example, one or any combination (e.g., all of): flag register(s) 114, shadow stack pointer (e.g., capability) register(s) 116, stack pointer (e.g., capability) register(s) 118, data capability register(s) 120, thread-local storage capability register(s) 122, code capability register(s) 124, general purpose (e.g., data) register(s) 126, or special purpose (e.g., data) register(s) 128. In certain examples, a user is allowed access to only a proper subset (e.g., not all) of registers 112.

In certain examples, register(s) are used to store one or more predicate values, e.g., status(es). In certain examples, flag register(s) 114 is included and the processor 100 (e.g., and not directly by a user) sets (e.g., to 1) or clears (e.g., to 0) a flag based on a corresponding status in the processor. In certain examples, a status is a value in flag register 114 that is modified as an effect of one or more arithmetic and/or logical (e.g., bit manipulation) operations by (e.g., execution by) the processor 100, e.g., and is not just a data value stored in a general-purpose register 126 (e.g., separate from the flag register 114) and/or is not memory access data (e.g., is not just a bounds check for a memory access). In certain examples, the flag register 114 includes a field (e.g., a single bit wide) for each flag therein. Flags may include one, all, or any combination of a carry flag (CF), a zero flag (ZF), an adjust flag (AF), a parity flag (PF), an overflow flag (OF), or a sign flag (SF). In certain examples, flag register 114 (e.g., only) includes six flags (e.g., CF, ZF, AF, PF, OF, and SF). In certain examples, each flag is a single bit, e.g., with certain bits of the register not utilized. In certain examples, CF is in bit index zero of flag register 114, ZF is in bit index six of flag register 114, AF is in bit index four of flag register 114, PF is in bit index two of flag register 114, OF is in bit index eleven of flag register 114, and/or SF is in bit index seven of flag register 114.

In certain examples, flag register 114 is a single logical register, e.g., referenced as EFLAGS (e.g., 32 bits wide) or RFLAGS (e.g., 64 bits wide). In certain examples, carry flag (CF) (e.g., bit) is set (e.g., to binary one) (e.g., by flag logic in an execution circuit that updates the flag register) if the result of an (e.g., arithmetic) operation (e.g., a micro-operation) has an arithmetic carry and cleared (e.g., to binary zero) if there is no arithmetic carry. In certain examples, a zero flag (ZF) is set (e.g., to binary one) (e.g., by flag logic in an execution circuit that updates the flag register) if the result of an (e.g., arithmetic) operation (e.g., a micro-operation) is a zero and cleared (e.g., to binary zero) if not a zero. In certain examples, an adjust flag (AF) (or auxiliary flag or auxiliary carry flag) is set (e.g., to binary one) (e.g., by flag logic in an execution circuit that updates the flag register) if the (e.g., arithmetic) operation (e.g., a micro-operation) has caused an arithmetic carry or borrow (e.g., out of the four least significant bits) and cleared (e.g., to binary zero) otherwise. In certain examples, a parity flag (PF) is set (e.g., to binary one) (e.g., by flag logic in an execution circuit that updates the flag register) if the result of an (e.g., arithmetic) operation (e.g., a micro-operation) has an even number and cleared (e.g., to binary zero) if an odd number. In certain examples, an overflow flag (OF) is set (e.g., to binary one) (e.g., by flag logic in an execution circuit that updates the flag register) if the result of an (e.g., arithmetic) operation (e.g., a micro-operation) overflows and cleared (e.g., to binary zero) if there is no overflow, for example, an overflow when the (e.g., signed two's-complement) result of the operation would not fit in the number of bits used for the operation, e.g., is wider than the execution circuit (e.g., arithmetic logic unit (ALU) thereof) width. In certain examples, a sign flag (SF) is set (e.g., to binary one) (e.g., by flag logic in an execution circuit that updates the flag register) if the result of an (e.g., arithmetic) operation (e.g., a micro-operation) has a negative number and cleared (e.g., to binary zero) if a positive number, e.g., for a signed (+ or −) value resultant. In certain examples, the flag register is an implicit operand of an instruction, e.g., an instruction that is setting the flag register and/or an instruction that is reading the flag register, e.g., in contrast to an explicit register named by an instruction.

In certain examples, memory 134 includes a stack 152 (e.g., and a shadow stack 154). A stack may be used to push (e.g., load data onto the stack) and/or pop (e.g., remove or pull data from the stack). In one example, a stack is a last in, first out (LIFO) data structure. As examples, a stack may be a call stack, data stack, or a call and data stack. In one example, a context for a first thread may be pushed and/or popped from a stack. For example, a context for a first thread may be pushed to a stack when switching to a second thread (e.g., and its context). Context (e.g., context data) sent to the stack may include (e.g., local) variables and/or bookkeeping data for a thread. A stack pointer (e.g., stored in a stack pointer register 118) may be incremented or decremented to point to a desired element of the stack.

In certain examples, a shadow stack 154 is used, for example, in addition to a (e.g., separate) stack 152 (e.g., as discussed herein). In one example, the term shadow stack may generally refer to a stack to store control information, e.g., information that can affect program control flow or transfer (e.g., return addresses and (e.g., non-capability) data values). In one example, a shadow stack 154 stores control information (e.g., pointer(s) or other address(es)) for a thread, for example, and a (e.g., data) stack may store other data, for example, (e.g., local) variables and/or bookkeeping data for a thread.

In certain examples, one or more shadow stacks 154 are included and used to protect an apparatus and/or method from tampering and/or increase security. The shadow stack(s) (e.g., shadow stack 154 in FIG. 1) may represent one or more additional stack type of data structures that are separate from the stack (e.g., stack 152 in FIG. 1). In one example, the shadow stack (or shadow stacks) is used to store control information but not data (e.g., not parameters and other data of the type stored on the stack, e.g., that user-level application programs are to write and/or modify). In one example, the control information stored on the shadow stack (or stacks) is return address related information (e.g., actual return address, information to validate return address, and/or other return address information). In one example, the shadow stack is used to store a copy of each return address for a thread, e.g., a return address corresponding to a thread whose context or other data has been previously pushed on the (e.g., data) stack. For example, when functions or procedures have been called, a copy of a return address for the caller may have been pushed onto the shadow stack. The return information may be a shadow stack pointer (SSP), e.g., that identifies the most recent element (e.g., top) of the shadow stack. In certain examples, the shadow stack may be read and/or written to in user level mode (for example, current privilege level (CPL) equal to three, e.g., a lowest level of privilege) or in a supervisor privilege level mode (for example, a current privilege level (CPL) less than three, e.g., a higher level of privilege than CPL=3). In one example, multiple shadow stacks may be included, but only one shadow stack (e.g., per logical processor) at a time may be allowed to be the current shadow stack. In certain examples, there is a (e.g., one) register of the processor to store the (e.g., current) shadow stack pointer.

In certain examples, the shadow stack (e.g., capability) register 116 stores a capability (e.g., a pointer with security metadata) that indicates the (e.g., address of the) corresponding element in (e.g., the top of) the shadow stack 154 in memory 134. In certain examples, the stack register 118 stores a capability (e.g., a pointer with security metadata) that indicates the (e.g., address of the) corresponding element in (e.g., the top of) the stack 152 in memory 134.

In certain examples, the data capability register(s) 120 stores a capability (e.g., a pointer with security metadata) that indicates the (e.g., address of the) corresponding data in memory 134 (e.g., data that is protected by the capability).

In certain examples, the thread-local storage capability register(s) 122 stores a capability (e.g., a pointer with security metadata) that indicates the (e.g., address of the) corresponding thread-local storage in memory 134 (e.g., thread-local storage that is protected by the capability). In certain examples, thread-local storage (TLS) is a mechanism by which variables are allocated such that there is one instance of the variable per extant thread, e.g., using static or global memory local to a thread.

In certain examples, the code capability register(s) 124 stores a capability (e.g., a pointer with security metadata) that indicates the (e.g., address of the) corresponding code (e.g., block of instructions) in memory 134 (e.g., code that is protected by the capability).

In certain examples, the general purpose (e.g., data) register(s) 126 are to store values (e.g., data). In certain examples, the general purpose (e.g., data) register(s) 126 are not protected by a capability (e.g., but they can be used to store a capability). In certain examples, general purpose (e.g., data) register(s) 126 (e.g., 64-bits wide) includes registers RAX, RBX, RCX, RDX, RBP, RSI, RDI, RSP, and R8 through R15.

In certain examples, the special purpose (e.g., data) register(s) 128 are to store values (e.g., data). In certain examples, the special purpose (e.g., data) register(s) 128 are not protected by a capability (e.g., but they may in some examples be used to store a capability). In certain examples, special purpose (e.g., data) register(s) 128 include one or any combination of floating-point data registers (e.g., to store floating-point formatted data), vector (e.g., Advanced Vector extension (AVX)) registers, two-dimensional matrix (e.g., Advanced Matrix extension (AMX)) registers, etc.

In certain examples, register(s) 112 includes register(s) dedicated only for capabilities, e.g., registers CAX, CBX, CCX, CDX, etc.). In certain examples, registers with literal names starting with the letter C are capability registers (e.g., cb, cd, ct, etc.), e.g., and general-purpose register names start with the letter R (e.g., rb, rd, rt, etc.).

Hardware processor 100 includes a coupling (e.g., connection) to memory 134. In certain examples, memory 134 is a memory local to the hardware processor (e.g., system memory). In certain examples, memory 134 is a memory separate from the hardware processor, for example, memory of a server. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain examples herein.

Hardware processor 100 includes a memory management circuit 130, for example, to control access (e.g., by the execution unit 106) to the (e.g., addressable memory 136 of) memory 134. Hardware processor 100 (e.g., memory management circuit 130) may include an encryption/decryption circuit 132, for example, to encrypt or decrypt data for memory 134.

Memory 134 may include virtual machine monitor code 150. In certain examples of computing, a virtual machine (VM) is an emulation of a computer system. In certain examples, VMs are based on a specific computer architecture and provide the functionality of an underlying physical computer system. Their implementations may involve specialized hardware, firmware, software, or a combination. In certain examples, the virtual machine monitor (VMM) (also known as a hypervisor) is a software program that, when executed, enables the creation, management, and governance of VM instances and manages the operation of a virtualized environment on top of a physical host machine. A VMM is the primary software behind virtualization environments and implementations in certain examples. When installed over a host machine (e.g., processor) in certain examples, a VMM facilitates the creation of VMs, e.g., each with separate operating systems (OS) and applications. The VMM may manage the backend operation of these VMs by allocating the necessary computing, memory, storage, and other input/output (I/O) resources, such as, but not limited to, memory management circuit 130. The VMM may provide a centralized interface for managing the entire operation, status, and availability of VMs that are installed over a single host machine or spread across different and interconnected hosts.

In certain examples, an instruction is to load a capability, store a capability, and/or switch between capabilities (e.g., switch an active first capability to being inactive and switch an inactive second capability to being active) in the hardware processor 100, e.g., via capability management circuit 108 using capability-based access control for enforcing memory safety. In certain examples, hardware processor 100 (e.g., the decoder circuit 104 and/or the execution circuit 106 thereof) executes a single instruction to cause performance of a predication check and a capability check, and then performs an operation in response to both of those checks passing. Examples of operations are discussed herein. It should be understood that numerous operations may be implemented by a predicated capability instruction, e.g., a move (e.g., load and/or store) operation, an arithmetic operation, a logic operation, etc. In certain examples, a failure of either of the predication check and the capability check causes the operation to not be performed, e.g., the processor 100 to fault.

In certain examples, hardware processor 100 (e.g., the decoder circuit 104 and/or the execution circuit 106 thereof) execute a single user level predicated capability instruction (e.g., accessible in user space) to cause performance of a predication check and a capability check, and then performs an operation in response to both of those checks passing.

A capability may have different formats and/or fields. In certain examples, a capability is more than twice the width of a native (e.g., integer) pointer type of the baseline architecture, for example, 128-bit or 129-bit capabilities on 64-bit platforms, and 64-bit or 65-bit capabilities on 32-bit platforms. In certain examples, each capability includes an (e.g., integer) address of the natural size for the architecture (e.g., 32 or 64 bit) and additional metadata (e.g., that is compressed in order to fit) in the remaining (e.g., 32 or 64) bits of the capability. In certain examples, each capability includes (or is associated with) a (e.g., 1-bit) validity "tag" whose value is maintained in registers and memory (e.g., in tags 146) by the architecture (e.g., by capability management circuit 108). In certain examples, each element of the capability contributes to the protection model and is enforced by hardware (e.g., capability management circuit 108).

In certain examples, when stored in memory, valid capabilities are to be naturally aligned (e.g., at 64-bit or 128-bit boundaries) depending on capability size where that is the granularity at which in-memory tags are maintained. In certain examples, partial or complete overwrites with data, rather than a complete overwrite with a valid capability, lead to the in-memory tag being cleared, preventing corrupted capabilities from later being dereferenced. In certain examples, capability compression reduces the memory footprint of capabilities, e.g., such that the full capability, including address, permissions, and bounds fits within a certain width (e.g., 128 bits plus a 1-bit out-of-band tag). In certain examples, capability compression takes advantage of redundancy between the address and the bounds, which occurs where a pointer typically falls within (or close to) its associated allocation. In certain examples, the compression scheme uses a floating-point representation, allowing high-precision bounds for small objects, but uses stronger alignment and padding for larger allocations.

Figure 2A:
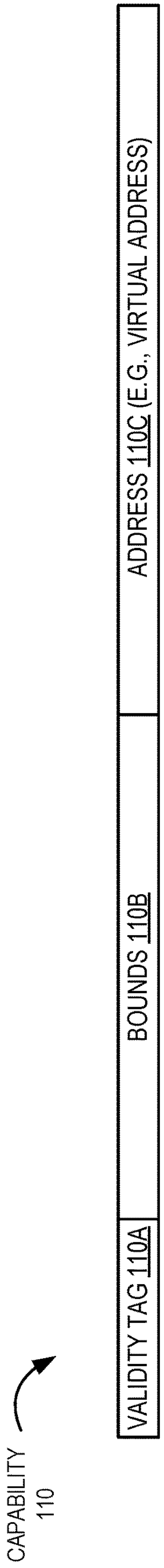
FIG. 2A illustrates an example format of a capability including a validity tag field, a bounds field, and an address field according to examples of the disclosure.
Figure 2B:
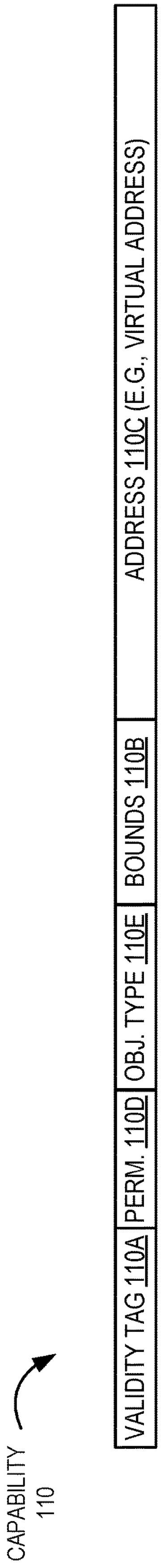
FIG. 2B illustrates an example format of a capability including a validity tag field, a permission field, an object type field, a bounds field, and an address field according to examples of the disclosure.

FIG. 2A illustrates an example format of a capability 110 including a validity tag 110A field, a bounds 110B field, and an address 110C (e.g., virtual address) field according to examples of the disclosure.

In certain examples, the format of a capability 110 includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space to which the capability authorizes access (e.g., loads, stores, instruction fetches, or other operations). An address 110C (e.g., virtual address) for the address of the capability protected data (e.g., object).

In certain examples, the validity tag 110A provides integrity protection, the bounds 110B limits how the value can be used (e.g., for example, for memory access), and/or the address 110C is the memory address storing the corresponding data (or instructions) protected by the capability.

In certain examples, one or more fields of a capability 110 are further used to implement predication, e.g., as discussed herein.

FIG. 2B illustrates an example format of a capability 110 including a validity tag 110A field, a permission(s) 110D field, an object type 110E field, a bounds 110B field, and an address 110C field according to examples of the disclosure.

In certain examples, the format of a capability 110 includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space (e.g., the range) to which the capability authorizes access (e.g., loads, stores, instruction fetches, or other operations). An address 110C (e.g., virtual address) for the address of the capability protected data (e.g., object). Permissions 110D include a value (e.g., mask) that controls how the capability can be used, e.g., by restricting loading and storing of data and/or capabilities or by prohibiting instruction fetch. An object type 110E that identifies the object, for example (e.g., in a (e.g., C++) programming language that supports a "struct" as a composite data type (or record) declaration that defines a physically grouped list of variables under one name in a block of memory, allowing the different variables to be accessed via a single pointer or by the struct declared name which returns the same address), a first object type may be used for a struct of people's names and a second object type may be used for a struct of their physical mailing addresses (e.g., as used in an employee directory). In certain examples, if the object type 110E is not equal to a certain value (e.g., −1), the capability is "sealed" (with this object type) and cannot be modified or dereferenced. Sealed capabilities can be used to implement opaque pointer types, e.g., such that controlled non-monotonicity can be used to support fine-grained, in-address-space compartmentalization.

In certain examples, permissions 110D include one or more of the following: "Load" to allow a load from memory protected by the capability, "Store" to allow a store to memory protected by the capability, "Execute" to allow execution of instructions protected by the capability, "LoadCap" to load a valid capability from memory into a register, "StoreCap" to store a valid capability from a register into memory, "Seal" to seal an unsealed capability, "Unseal" to unseal a sealed capability, "System" to access system registers and instructions, "BranchSealedPair" to use in an unsealing branch, "CompartmentID" to use as a compartment ID, "MutableLoad" to load a (e.g., capability) register with mutable permissions, and/or "User[N]" for software defined permissions (where N is any positive integer greater than zero).

In certain examples, the validity tag 110A provides integrity protection, the permission(s) 110D limits the operations that can be performed on the corresponding data (or instructions) protected by the capability, the bounds 110B limits how the value can be used (e.g., for example, for memory access), the object type 110E supports higher-level software encapsulation, and/or the address 110C is the memory address storing the corresponding data (or instructions) protected by the capability.

In certain examples, a capability (e.g., value) includes one or any combination of the following fields: address value (e.g., 64 bits), bounds (e.g., 87 bits), flags (e.g., 8 bits), object type (e.g., 15 bits), permissions (e.g., 16 bits), tag (e.g., 1 bit), global (e.g., 1 bit), and/or executive (e.g., 1 bit). In certain examples, the flags and the lower 56 bits of the "capability bounds" share encoding with the "capability value".

In certain examples, a capability is an individually revocable capability (IRC). In certain examples, each address space has capability tables for storing a capability associated with each memory allocation, and each pointer to that allocation contains a field (e.g., table index) referencing the corresponding table entry (e.g., a tag in that entry). In certain embodiments, IRC deterministically mitigates spatial vulnerabilities.

In certain examples, the format of a capability (for example, as a pointer that has been extended with security metadata, e.g., bounds, permissions, and/or type information) overflows the available bits in a pointer (e.g., 64-bit) format. In certain examples, to support storing capabilities in a general-purpose register file without expanding the registers, examples herein logically combine multiple registers (e.g., four for a 256-bit capability) so that the capability can be split across those multiple underlying registers, e.g., such that general purpose registers of a narrower size can be utilized with the wider format of a capability as compared to a (e.g., narrower sized) pointer.

In certain examples, one or more fields of a capability 110 are further used to implement predication, e.g., as discussed herein.

In certain examples, when a processor (e.g., core) executes a predicated capability instruction (PCI), the processor first checks whether its predicate is satisfied by the current processor context and/or instruction operands, e.g., (i) if the predicate is not satisfied, then no further operations are performed, and the instruction is allowed to retire (e.g., finish executing and commit to the processor's architectural state) and/or (ii) if the predicate is satisfied, then the processor may continue to execute other operations, according to the predicated capability instruction's semantics. In certain examples, a processor is to signal a hardware error (e.g., a fault) when the predicate is not satisfied and/or when the capability is not satisfied. Example semantics of a predicated capability instruction (e.g., a PCI) are illustrated in FIG. 3.

Figure 3:
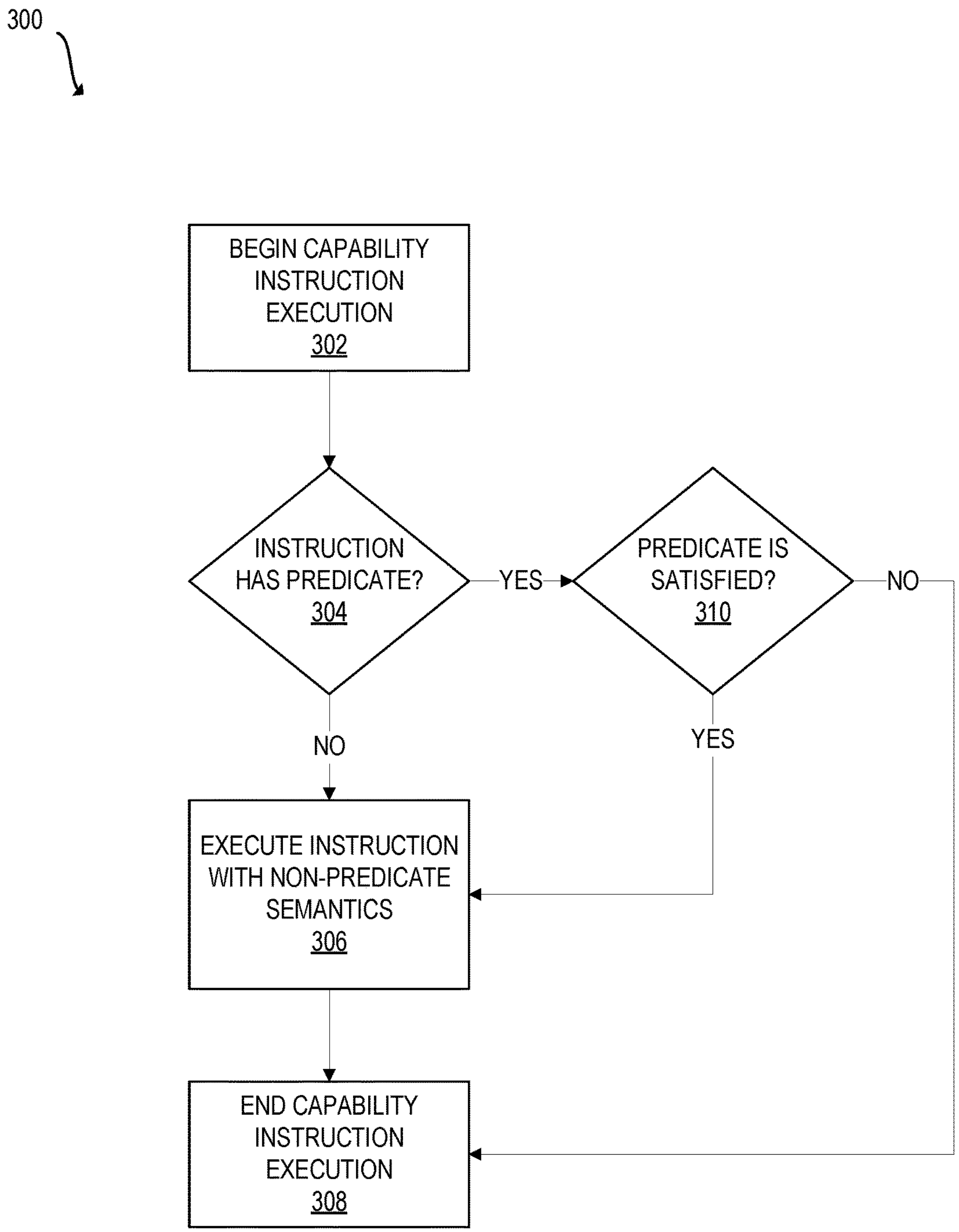
FIG. 3 illustrates a flow of operations of a predicated capability instruction according to examples of the disclosure.

FIG. 3 illustrates a flow of operations 300 of a predicated capability instruction according to examples of the disclosure. In certain examples, execution of a predicated capability instruction causes the performance of operations 300. The operations 300 include, at block 302, beginning capability instruction execution (e.g., checking if the instruction is a capability instruction or a non-capability instruction, e.g., as discussed herein). The operations 300 further include, at block 304, checking if the capability instruction has a predicate (e.g., checking an opcode, opcode extension, operand, and/or instruction prefix of the capability instruction), and if not, proceeding to block 306, and if yes, proceeding to block 310. The operations 300 further include, at block 306, executing the capability instruction with non-predicate semantics (e.g., not performing a predicate check during execution of the capability instruction). The operations 300 further include, at block 310, checking if the predicate is satisfied (e.g., checking one or more flags of a flag register), and if yes, proceeding to block 306, and if not, proceeding to block 308. The operations 300 further include, at block 308, ending execution of (e.g., retiring) the capability instruction.

Certain examples herein involve a microarchitectural implementation of a predicated capability instruction. In certain examples, a capability instruction implementation may or may not serialize its capability checks (for example, bounds checks) with subsequent operations that use the capability, for example, where the serialization prevents the subsequent operations that use the capability from executing until the capability check(s) resolve, e.g., while other subsequent operations that do not use the capability may execute without waiting for the capability checks. This serialization can, for example, help to mitigate speculative execution vulnerabilities. Independent from this serialization, certain examples herein also serialize the predicate check with subsequent operations that use the capability. Descriptions herein refer to examples that serialize the predicate with subsequent operations as serializing and examples that do not enforce this serialization are referred to as non-serializing.

The following discusses three examples formats of a predicated capability instruction.

In the first format, a predicated capability instruction can be a distinct instruction with its own opcode, for example, a predicated capability instruction in a Microprocessor without Interlocked Pipelined Stages (MIPS) architecture. In certain examples, a predicated capability instruction to dereference and load data using a capability can have either a unique opcode, or an opcode shared with similar instructions but with a different function field (e.g., analogous to an opcode extension on x86 architecture). In certain examples, the predicate is identified (e.g., provided) as part of the opcode, function (or opcode extension), or as an operand.

In the second format, a predicated capability instruction is a tweak to an instruction. For example, certain architectures (e.g., x86) allow instructions to have prefixes that modify the instruction's behavior. This tweak could be a new prefix or an extension to an existing prefix (such as an enhanced vector extension (EVEX) prefix) where some bits of the prefix indicate the predicate (e.g., condition code).

In the third format, the predicated capability instruction functionality is achieved by a logical coupling of two (e.g., macro) instructions that together have the semantics of a predicated capability instruction of the first or second sort. The semantics of predicated capability instructions of the third sort may differ from what is depicted in FIG. 3. Their semantics may vary by architectural implementation and is shown herein with an example.

Certain ISAs allow for instructions that execute conditionally, e.g., facilitated by an instruction prefix (e.g., an extension to the EVEX prefix) that augments (e.g., legacy) instructions with a non-destructive destination (NDD) operand, e.g., as well as additional flags. When combined with a conditional move with condition code (CMOVcc) instruction, certain instructions can thus execute with conditional semantics. The example assembly code (e.g., x86 assembly code written in "AT&T" syntax) below illustrates this behavior:

CMP % r9, % r10

ADD 8, % r15, % r8, nf

CMOVE % r8, % r15//where 8+r15→r15 if r9==r10

Note that certain assembly language examples herein follow a syntax convention where a preceding % before a register name means the content of a register, e.g., % r9 means the operand is the value stored within register r9. The CMP instruction modifies a flag register (e.g., RFLAGS) according to the arithmetic relationship between the r9 value and the register r10 value (e.g., it subtracts the r10 value from the r9 value, and sets flags (e.g., CF, OF, SF, ZF, AF, and PF flags) according to the result). In certain examples, the addition (ADD) instruction is augmented with a prefix (e.g., EVEX) (not shown) that modifies its behavior as follows: r8 is written with the sum of r15 and 8, and the no flags (nf) indication prevents the ADD from modifying the flag register (e.g., RFLAGS). In certain examples, the CMOVE instruction writes the sum back to r15 if r9 and r10 are equal; otherwise, r15 is unchanged. The coupling of the NDD ADD instruction and the CMOVcc instruction yields a semantic that is very similar to a predicated ADD (ADDcc, shown below as ADDE for an equal "E" condition code (cc) check) instruction, for example:

CMP % r9, % r10

ADDE 8, % r15//where 8+r15→r15 if r9==r10

Certain processors (e.g., and their ISA) include a set of capability register extensions to (e.g., x86) general-purpose registers, e.g., as shown in FIG. 1. For example, CBP would be the capability register extension to an (e.g., x86) base pointer (RBP) register. An example (e.g., x86) capability instruction is:

ADD (% c8), % r15 which reads (from memory) into register r15 a (e.g., 64-bit) value protected by the capability described by the c8 capability register (e.g., data capability register 120 in FIG. 1). Similar to the example above, this (e.g., x86) capability instruction can be augmented with an NDD and combined with a CMOVcc instruction to create a PCI of the third format:

CMP % r9, % r10

ADD (% c8), % r15, % r11, nf

CMOVE % r11, % r15//where (c8)+r15→r15 if r9==r10

Instructions of the second format can also be added to an architecture (e.g., x86 architecture) by introducing capabilities to a predicated instruction (e.g., via new opcode(s) or a prefix extension) yielding, for example, a new ADDcc predicated capability instruction (PCI) (where cc is the condition code to check):

CMP % r9, % r10

ADDE (% c8), % r15//(c8)+r15→r15 if r9==r10 where the E in ADDE indicates an "equal" check (e.g., based on an equal indication (e.g., via checking the zero flag (ZF)) generated or not by the compare (CMP) operation), e.g., and the parenthesis around a register name and the leading "c" indicates it is a capability register in the above shown format.

In certain examples, the condition codes are according to the following table (e.g., the PCI instruction checks the condition as the predicate):

| Code | Meaning | Condition | Notes |
|---|---|---|---|
| E | Equal | ZF | |
| Z | Zero | | |
| NE | Not equal | !ZF | |
| NZ | Not zero | | |
| A | Above | !CF && !ZF | Unsigned greater than Where "&&" returns true is both operands are true and returns false otherwise |
| NBE | Not below or equal | | |
| AE | Above or equal | !CF | Unsigned greater than or equal |
| NB | Not below | | |
| NC | No carry | No unsigned overflow | |
| B | Below | CF | Unsigned less than |
| NAE | Not above or equal | | |
| C | Carry set | Unsigned overflow | |
| BE | Below or equal | CF \|\| ZF | Unsigned less than or equal |
| NA | Not above | | |
| G | Greater | !(SF ^ OF) && !ZF | Signed greater than |
| NLE | Not less than or equal | | |
| GE | Greater than or equal | !(SF ^ OF) | Signed greater than or equal |
| NL | Not less than | | |
| L | Less than | (SF ^ OF) | Signed less than |
| NGE | Not greater than or equal | | |
| LE | Less than or equal | (SF ^ OF) \|\| ZF | Signed less than or equal |
| NG | Not greater than | | |
| S | Sign | SF | Negative |
| NS | No sign | !SF | Positive or zero |
| O | Overflow | OF | Signed overflow |
| NO | No overflow | !OF | No signed overflow |
| P | Parity | PF | Even number of bits set |
| PE | Parity even | | |
| NP | No parity | !PF | Odd number of bits set |
| PO | Parity odd | | |

In certain examples, conditional instruction execution is combined with a capability to generate novel ISA semantics, for example, in a single macro-instruction that performs all of that functionality. e.g., the operations 300 in FIG. 3.

The following describes example solutions to the three technical issues and problems (i)-(iii) mentioned above.

(I) Methods to Use PCIs to Mitigate Speculation Vulnerabilities

As mentioned above, some capability architectures may serialize capability checks with operations that use the capability provided. This can provide some protection against speculation vulnerabilities. For example, some capability implementations may serialize a capability bounds check with a subsequent operation that is intended to load from within the capability bounds. This behavior can mitigate a Bounds Check Bypass speculation vulnerability (e.g., a variant of Spectre), but it does not mitigate speculation vulnerabilities that arise from control flow instructions (e.g., branches).

Figure 4:
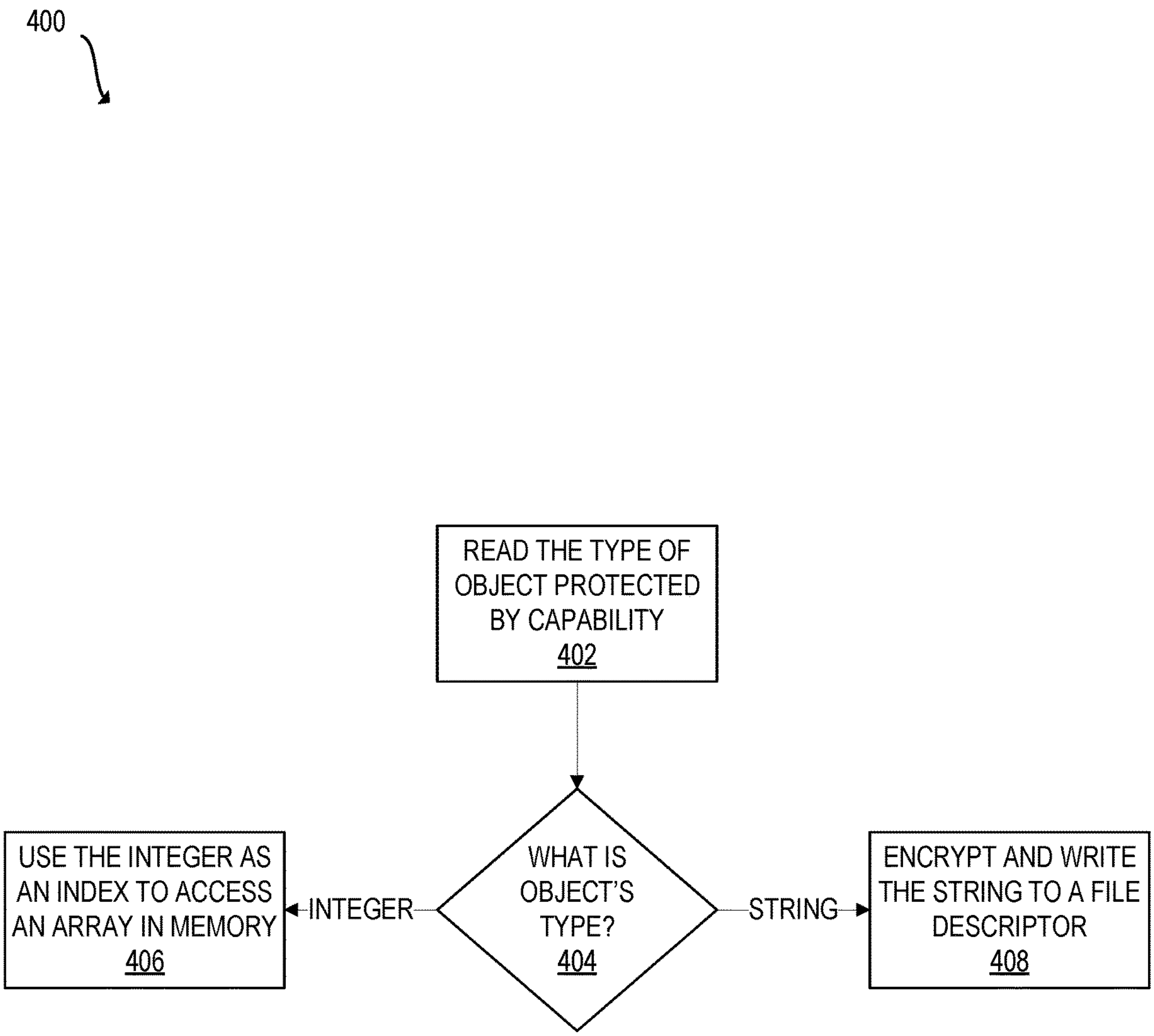
FIG. 4 illustrates a flow of a program that can operate on data whose type is determined at runtime according to examples of the disclosure.

FIG. 4 illustrates a flow of a program 400 that can operate on data whose type is determined at runtime according to examples of the disclosure. In certain examples, FIG. 4 is illustrative of how a program (such as a web browser) can perform dynamic typing on an Object, while the Object may be protected by Capability. In certain examples, the Object (e.g., an Extensible Markup Language (XML) element) can either encapsulate an integer (e.g., a numeric value without a fractional component) or a string (e.g., characters, line feeds, carriage returns, and tab characters). In certain examples, program 400 is to, at block 402, read the type of object protected by a capability, and then check, at block 404, the type of object (e.g., read the object type field 110E of the capability in FIG. 2B) (or alternatively, blocks 402 and 404 may be combined into a single block), and if, an integer, proceed to block 406 and if a string, proceed to block 408. In certain examples, if the Object is an integer, the program at block 406 will use it as an array index to access memory and if the object is a string, the program at block 408 will encrypt and write the string to a file descriptor. A capability architecture can provide additional security for either of these two operations: the capability can prevent the integer from being used to access memory out of bounds, and it can also prevent strings from being read and/or written out of bounds.

However, a capability may not provide security against the consequences of branch speculation (e.g., branch prediction), e.g., even if the microarchitecture serializes the capability check to precede the capability use. If the "What is the object's type?" block 404 in FIG. 4 is implemented using a conditional branch, then a capability that protects a string could be confused for a capability that protects an integer. In this scenario, bytes of the (e.g., possibly sensitive) string could be used as an index to access an array in memory, thus potentially leaking this data over a side channel. This is an example of a speculative type confusion vulnerability.

The assembly code below illustrates how serializing examples of predicated capabilities can be used to prevent these kinds of vulnerabilities. In the example, assume rbx indicates the type of the object protected by cbp, and rbx=0 implies that the type is a string, and rbx !=0 implies that the type is an integer. In this example, if the object is a string, then the jump if equal (je) instruction will jump to .string_op (not shown). In this example, otherwise, the load will execute, subject to the (serialized) requirement that the condition code "ne" (NE in the table above) is (e.g., must be) satisfied. In this example, if the direction of the je branch is mis-predicted, then the ne condition code is not satisfied, and the capability will not be used-even speculatively (for a serializing example). Conceptually, the code below associates a high-level program type (for example, string or integer) with a capability, and in a manner that can be enforced throughout a program, e.g., by a compiler, a just-in-time (JIT) compilation, or runtime. For example, a compiler can be implemented to emit instructions that use a string capability following the pattern of the example code below.

```
CMP rbx, 0
JE .string_op
ADD (% c8), % r15, % r11, nf//e.g., read from memory
    at c8, read r15, and write to r11
CMOVNE % r11, % r15
```

where the "NE" (not equal) is the condition code (cc) for a conditional move (CMOVcc) (e.g., based on a not equal indication (e.g., via checking the zero flag (ZF)) generated or not by the previous operation(s)). Thus, in certain examples, CMOVNE will not execute (e.g., will fault) if the CMP operation fails (e.g., the object is not a string), so CMOVNE protects if a wrong object type, e.g., register r15 is only updated if an integer type (e.g., as indicated by a value in rbx) and not another type (e.g., string).

Certain type-safe languages (e.g., Rust and Java) allow the compiler/runtime to apply additional mitigations to prevent type confusion, including speculative type confusion. Whenever the compiler/runtime generates a dynamic cast or other branch predicated on a type check for capability-protected data, certain examples herein (e.g., via the compiler) can substitute a PCI for a non-predicated capability instruction in the manner illustrated in the example above.

(II) Methods to Scale Capability Architectures to (e.g., Extremely) Fine-Grained Access Control.

Web servers, databases, memory caches, and other server backend architectures can be expected to serve millions of users while protecting their sensitive data and their privacy. Certain ISA-defined primitives (e.g., an object type) do not scale to millions of unique IDs. Instead, user authorization checks may be implemented with branches, such as the example shown in FIG. 5.

Figure 5:
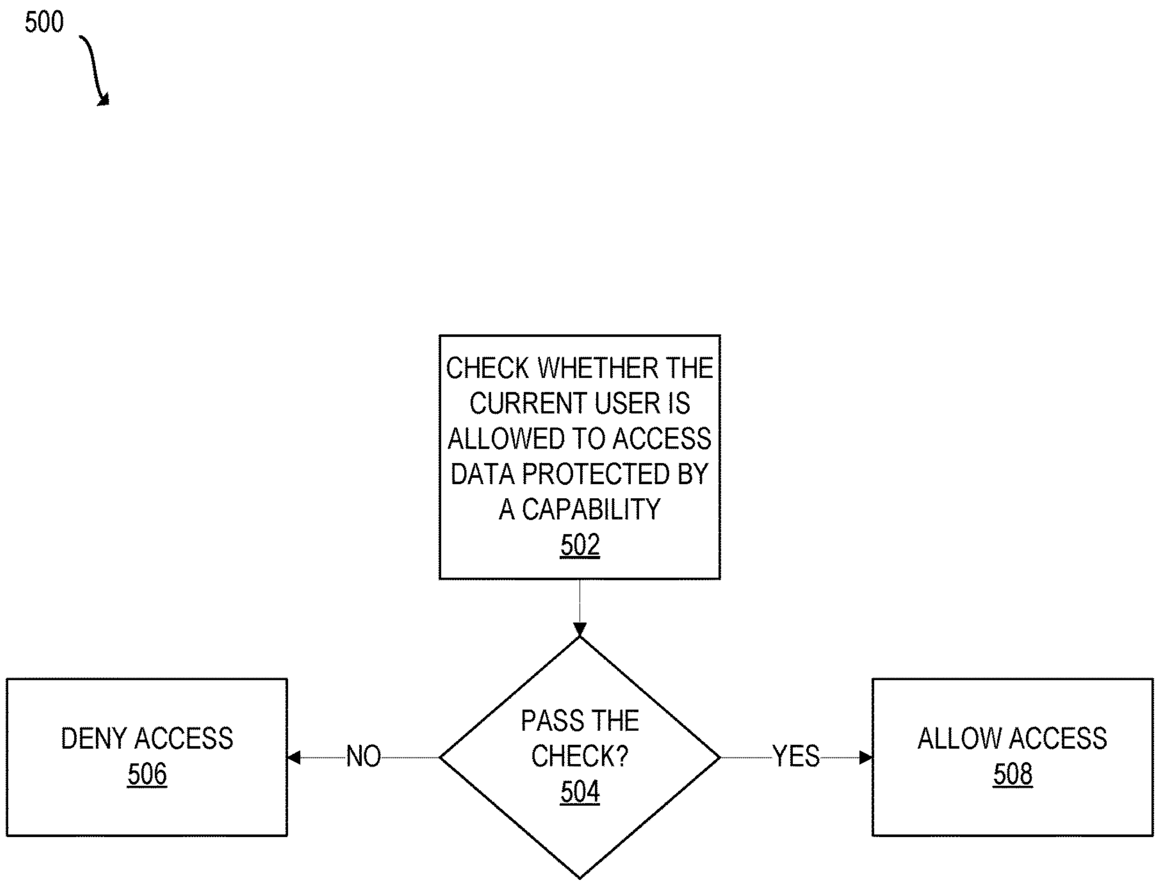
FIG. 5 illustrates a flow of a program that can operate on data subject to a software-defined access control policy according to examples of the disclosure.

FIG. 5 illustrates a flow of a program 500 that can operate on data subject to a software-defined access control policy according to examples of the disclosure. In certain examples, program 500 is to, at block 502, to check whether the current user is allowed to access data (e.g., operands) protected by a capability, and if passing the check at block 504, allowing access at block 508 and if not passing the check at block 504, denying access at block 506 (or alternatively, blocks 502 and 504 may be combined into a single block).

Similar to the examples methods to use PCIs to mitigate speculation vulnerabilities above, the predicate can be used to bind each use of a capability to a check (such as a comparison (CMP) or test (TEST) instruction, e.g., on x86) that determines whether a given principal (such as a human user) should be allowed to read, write, and/or modify data protected by a capability.

(III) Methods to Support if-Elimination on Capability Architectures

Some conditional branches in code may be difficult for a branch prediction unit (e.g., branch prediction circuit) to predict. For example, a conditional branch may be taken 50% of the time and not taken 50% of the time. Poor prediction accuracy is a cause of bad speculation that can degrade performance. Certain compilers use heuristics to identify these branches and may apply an optimization called if-elimination to transform the conditional branch and conditionally executed basic blocks into non-branching code with identical semantics. For example, FIG. 6 shows how this optimization can be applied to code that either performs an addition if r9 and r10 are not equal, or a subtraction if they are equal.

FIG. 6 illustrates a comparison of code 602 with a conditional branch against code 604 that writes the same value to the register (r12) using if-elimination that eliminates the condition branch (shown as JE branch instruction in code 602) according to examples of the disclosure. In certain examples, register r9 stores a value indicative of a user ID permitted to access an object, and register r10 stores a value indicative of a user ID that is requesting access to the object. The code 604 illustrates how using an addition (ADD) instruction (with the no flags "nf" indication set) to sum r11 and r12 without modifying either register and without clobbering (e.g., overwriting) the flags (e.g., RFLAGS), and similarly the subtraction (SUB) instruction does not clobber (e.g., overwriting) the flags (e.g., RFLAGS). Hence, the flags (e.g., RFLAGS) set by the CMP instruction can be used by the CMOVNE instruction to write the correct value into r12. If the result of the CMP instruction is difficult to predict, then the if-eliminated code 604 typically performs better than the code 602 because none of the instructions are predicted and therefore cannot be a source of bad speculation. FIG. 7 shows how a similar optimization can be applied to capability code using a PCI.

FIG. 7 illustrates a comparison of capability code 702 with a conditional branch against capability code 704 that writes the same value to the register (r12) using if-elimination that eliminates the condition branch (shown as JE branch instruction in code 702) according to examples of the disclosure. In code 704, the SUB instruction followed by the CMOVE instruction logically constitutes a PCI of the third format, modifying the contents of register r14 with the capability protected by capability register c13 only if the contents of register r9 and register r10 are equal. In certain examples, if an ISA supports PCIs of the first format or the second format, then this operation can be performed by a single instruction with a non-destructive destination, for example:

SUBE (% c13), % r12, % r14//r12−(c13)→r14 if r9==r10 where the "E" (equal) is the condition code (cc) for a conditional subtraction (SUBcc).

In certain examples, a compiler (or managed runtime, JIT, etc.) can use PCIs to apply if-elimination to branches whose scope(s) include capability instructions by transforming the capability instructions into PCIs, e.g., in the manner demonstrated in FIG. 7.

At least some examples of the disclosed technologies can be described in view of the following examples:

Example 1. An apparatus comprising:

a capability management circuit to check a capability for a memory access request for a memory, the capability comprising an address field for an address to be accessed by the memory access request and a bounds field that is to indicate a lower bound and an upper bound of an address space to which the capability authorizes access;

a decoder circuit to decode a single instruction into a decoded single instruction, the single instruction comprising a field to indicate the capability, and an opcode to indicate:

an operation to be performed for the address (e.g., load data from the address and/or stored data to the address), that an execution circuit is to perform a first check that a condition code, that indicates a status (e.g., not data) from a previous execution of the execution circuit, is a certain value, that the capability management circuit is to perform a second check that the capability is authorized to access the address, and in response to the first check and the second check both passing, cause the execution circuit to perform the operation for the address; and the execution circuit to execute the decoded single instruction according to the opcode.

Example 2. The apparatus of example 1, wherein the single instruction comprises a second field that indicates a flag register (e.g., EFLAGS or RFLAGS) to store the condition code that indicates the status from the previous execution of the execution circuit.

Example 3. The apparatus of example 1, wherein the opcode indicates the certain value.

Example 4. The apparatus of example 1, wherein the execution circuit is to, in response to the first check indicating that the status is not the certain value, cause the single instruction to fault.

Example 5. The apparatus of example 1, wherein the execution circuit is to, in response to a third check indicating that a validity tag of the capability is not set, cause the single instruction to fault.

Example 6. The apparatus of example 1, wherein the first check of the condition code is performed before the second check is performed by the capability management circuit.

Example 7. The apparatus of example 6, wherein the execution circuit is to, in response to the first check indicating that the status is not the certain value, cause the single instruction to fault before the second check is performed by the capability management circuit.

Example 8. A method comprising:

- decoding, by a decoder circuit of a processor, a single instruction into a decoded single instruction, the single instruction comprising:
  - a field to indicate a capability for a memory access request for a memory, the capability comprising an address field for an address to be accessed by the memory access request and a bounds field that is to indicate a lower bound and an upper bound of an address space to which the capability authorizes access, and
  - an opcode to indicate:
    - an operation to be performed for the address,
    - that an execution circuit of the processor is to perform a first check that a condition code, that indicates a status from a previous execution of the execution circuit, is a certain value,
    - that a capability management circuit of the processor is to perform a second check that the capability is authorized to access the address, and
    - in response to the first check and the second check both passing, cause the execution circuit to perform the operation for the address; and
- executing, by the execution circuit, the decoded single instruction according to the opcode.

Example 9. The method of example 8, wherein the single instruction comprises a second field that indicates a flag register to store the condition code that indicates the status from the previous execution of the execution circuit.

Example 10. The method of example 8, wherein the opcode indicates the certain value.

Example 11. The method of example 8, wherein the executing is to, in response to the first check indicating that the status is not the certain value, cause the single instruction to fault.

Example 12. The method of example 8, wherein the executing is to, in response to a third check indicating that a validity tag of the capability is not set, cause the single instruction to fault.

Example 13. The method of example 8, wherein the first check of the condition code is performed before the second check is performed by the capability management circuit.

Example 14. The method of example 13, wherein the executing is to, in response to the first check indicating that the status is not the certain value, cause the single instruction to fault before the second check is performed by the capability management circuit.

Example 15. A non-transitory machine-readable medium that stores code that when executed by a machine causes the machine to perform a method comprising:

- decoding, by a decoder circuit of a processor, a single instruction into a decoded single instruction, the single instruction comprising:
  - a field to indicate a capability for a memory access request for a memory, the capability comprising an address field for an address to be accessed by the memory access request and a bounds field that is to indicate a lower bound and an upper bound of an address space to which the capability authorizes access, and
  - an opcode to indicate:
    - an operation to be performed for the address,
    - that an execution circuit of the processor is to perform a first check that a condition code, that indicates a status from a previous execution of the execution circuit, is a certain value,
    - that a capability management circuit of the processor is to perform a second check that the capability authorizes access to the address, and
    - in response to the first check and the second check both passing, cause the execution circuit to perform the operation for the address; and
- executing, by the execution circuit, the decoded single instruction according to the opcode.

Example 16. The non-transitory machine-readable medium of example 15, wherein the single instruction comprises a second field that indicates a flag register to store the condition code that indicates the status from the previous execution of the execution circuit.

Example 17. The non-transitory machine-readable medium of example 15, wherein the opcode indicates the certain value.

Example 18. The non-transitory machine-readable medium of example 15, wherein the executing is to, in response to the first check indicating that the status is not the certain value, cause the single instruction to fault.

Example 19. The non-transitory machine-readable medium of example 15, wherein the first check of the condition code is performed before the second check is performed by the capability management circuit.

Example 20. The non-transitory machine-readable medium of example 19, wherein the executing is to, in response to the first check indicating that the status is not the certain value, cause the single instruction to fault before the second check is performed by the capability management circuit.

Exemplary architectures, systems, etc. that the above may be used in are detailed below. Exemplary instruction formats for capability instructions are detailed below.

Figure 8:
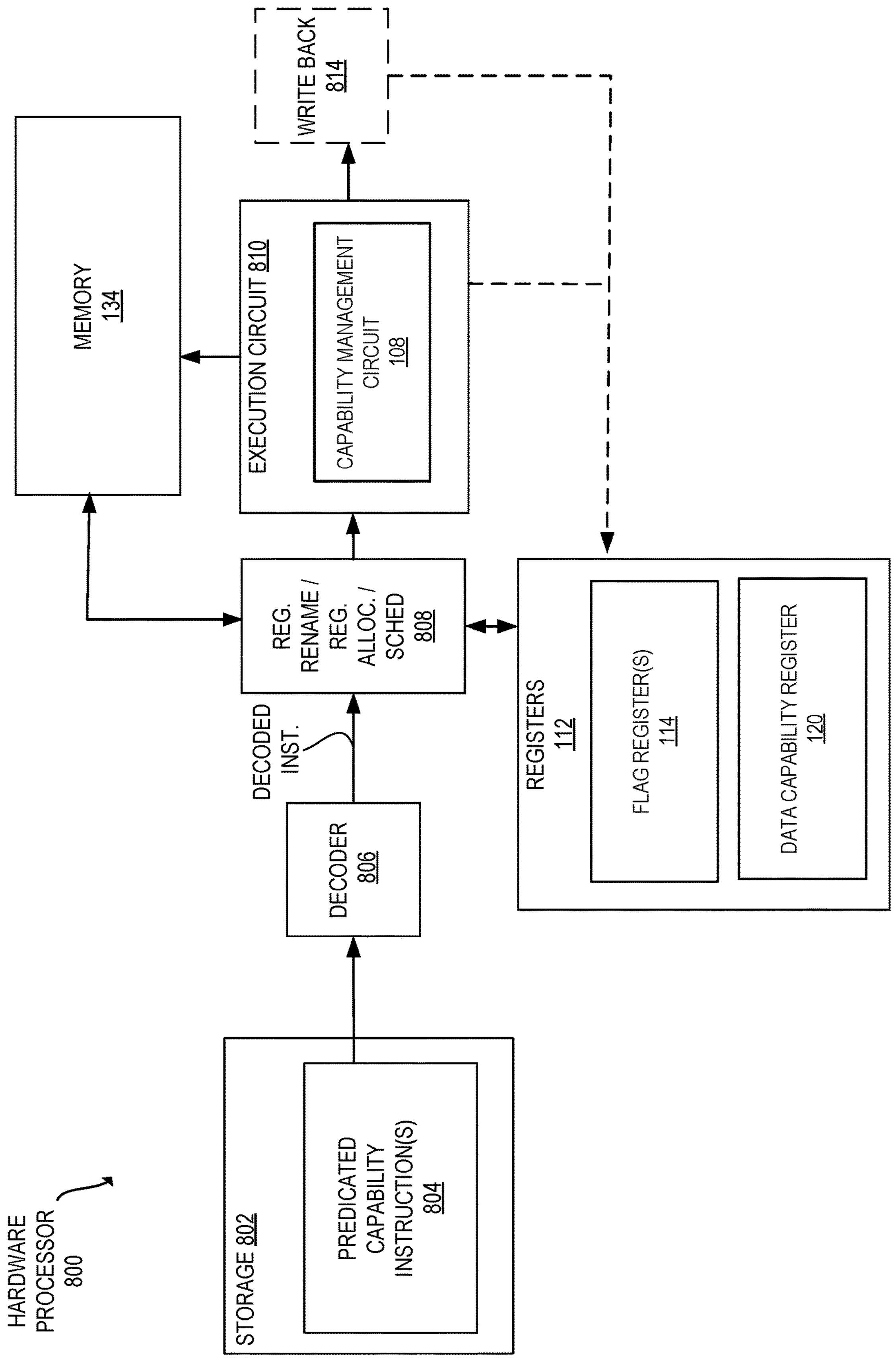
FIG. 8 illustrates examples of computing hardware to process a PREDICATED CAPABILITY instruction.

FIG. 8 illustrates examples of computing hardware to process a PREDICATED CAPABILITY instruction. The instruction may implement, in addition to a predication check and a capability check(s), a variety of operations, e.g., operations affecting capability and general-purpose (e.g., integer) registers as well as memory access and control flow. In certain examples, a PREDICATED CAPABILITY instruction is to, in addition to a predication check and a capability check(s), perform one or more operations (e.g., logical and/or arithmetic operations) on data that is accessed via capabilities, e.g., from memory 134. As illustrated, storage 802 stores a PREDICATED CAPABILITY instruction 804 to be executed.

In certain examples, the instruction 804 is received by decoder circuitry 806. For example, the decoder circuitry 806 receives this instruction from fetch circuitry (not shown). The instruction may be in any suitable format, such as that described with reference to FIG. 16 below. In an example, the instruction includes fields for a source operand(s) identifier(s), a destination identifier, an opcode, and a capability (e.g., stored in data capability register 120), and the instruction identifies a predicate (e.g., condition) to be checked. In certain examples, the predicate is identified (e.g., provided) as part of the opcode, function (or opcode extension), or as an operand. In some examples, the sources and destination are registers, and in other examples one or more are memory locations. In some examples, one or more of the sources may be an immediate operand. In some examples, the opcode of an instruction details the predicate (e.g., condition) check and/or the capability check that are to be performed, e.g., and the other operation(s) to be performed by the instruction.

More detailed examples of at least one instruction format for the instruction will be detailed later. The decoder circuitry 806 decodes the instruction into one or more operations. In some examples, this decoding includes generating a plurality of micro-operations to be performed by execution circuitry (such as execution circuitry 810). In certain examples, the decoder circuitry 806 also decodes instruction prefixes.

In some examples, register renaming, register allocation, and/or scheduling circuitry 808 provides functionality for one or more of: 1) renaming logical operand values to physical operand values (e.g., a register alias table in some examples), 2) allocating status bits and flags to the decoded instruction, and 3) scheduling the decoded instruction for execution by execution circuitry out of an instruction pool (e.g., using a reservation station in some examples).

Registers (register file) 112 and/or memory 134 store data as operands of the instruction to be operated by execution circuitry 810. Example register types include packed data registers, general purpose registers (GPRs), and floating-point registers.

Execution circuitry 810 executes the decoded instruction. Example detailed execution circuitry includes execution circuit 106 shown in FIG. 1, and execution cluster(s) 1360 shown in FIG. 13B, etc. In certain examples, the execution of the decoded instruction causes the execution circuitry 810 to perform a first check that a condition code, that indicates a status from a previous execution of the processor 800 (e.g., execution circuit 810), is a certain value (e.g., indicated by a condition indication (e.g., "cc" as discussed herein) of the instruction, and perform (e.g., cause the capability management circuit 108 to perform) a second check that the capability authorizes access to the address (or register) indicated by the capability, and in response to the first check and the second check both passing, cause the execution circuit 810 to perform the indicated operation (e.g., move, add, subtract, jump, etc.) for the address (or register). In some examples, retirement/write back circuitry 814 architecturally commits the destination register into the registers 112 or memory 134 and retires the instruction.

An example of a format for a PREDICATED CAPABILITY instruction is OPCODE SRC, SRC2. In some examples, OPCODE is the opcode mnemonic of the instruction. In certain examples, another (e.g., implicit) source is one or more flags of a flag register 114. In certain examples, the SRC is one or more registers, e.g., data capability register 120 for a capability.

Figure 9:
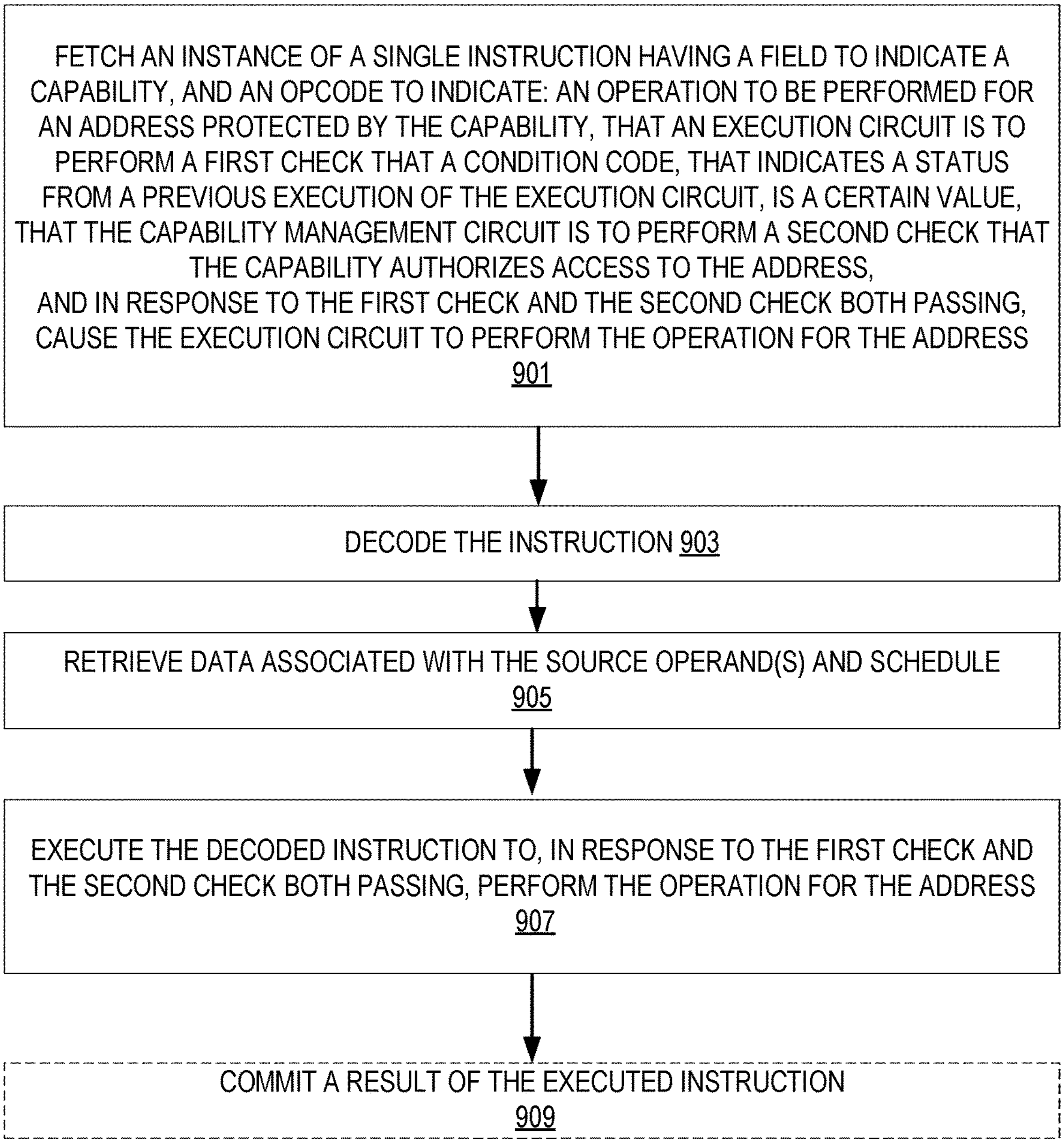
FIG. 9 illustrates an example method performed by a processor to process a PREDICATED CAPABILITY instruction.

FIG. 9 illustrates an example method performed by a processor to process a PREDICATED CAPABILITY instruction. For example, a processor core as shown in FIG. 13B, a pipeline as detailed below, etc., performs this method.

At 901, an instance of single instruction is fetched. For example, a PREDICATED CAPABILITY instruction is fetched. The instruction includes fields as discussed herein. In some examples, the instruction further includes a field for a writemask. In some examples, the instruction is fetched from an instruction cache. In certain examples, the opcode indicates the operations to perform, e.g., including predicate and capability checks.

The fetched instruction is decoded at 903. For example, the fetched PREDICATED CAPABILITY instruction is decoded by decoder circuitry such as decoder circuitry 806 or decode circuitry 1340 detailed herein.

Data values associated with the source operands of the decoded instruction are retrieved when the decoded instruction is scheduled at 905. For example, when one or more of the source operands are memory operands, the data from the indicated memory location is retrieved.

At 907, the decoded instruction is executed by execution circuitry (hardware) such as execution circuit 106 shown in FIG. 1, execution circuitry 810 shown in FIG. 8, or execution cluster(s) 1360 shown in FIG. 13B. For the PREDICATED CAPABILITY instruction, in certain examples, the execution will cause execution circuitry to perform the operations described herein.

In some examples, the instruction is committed or retired at 909.

Figure 10:
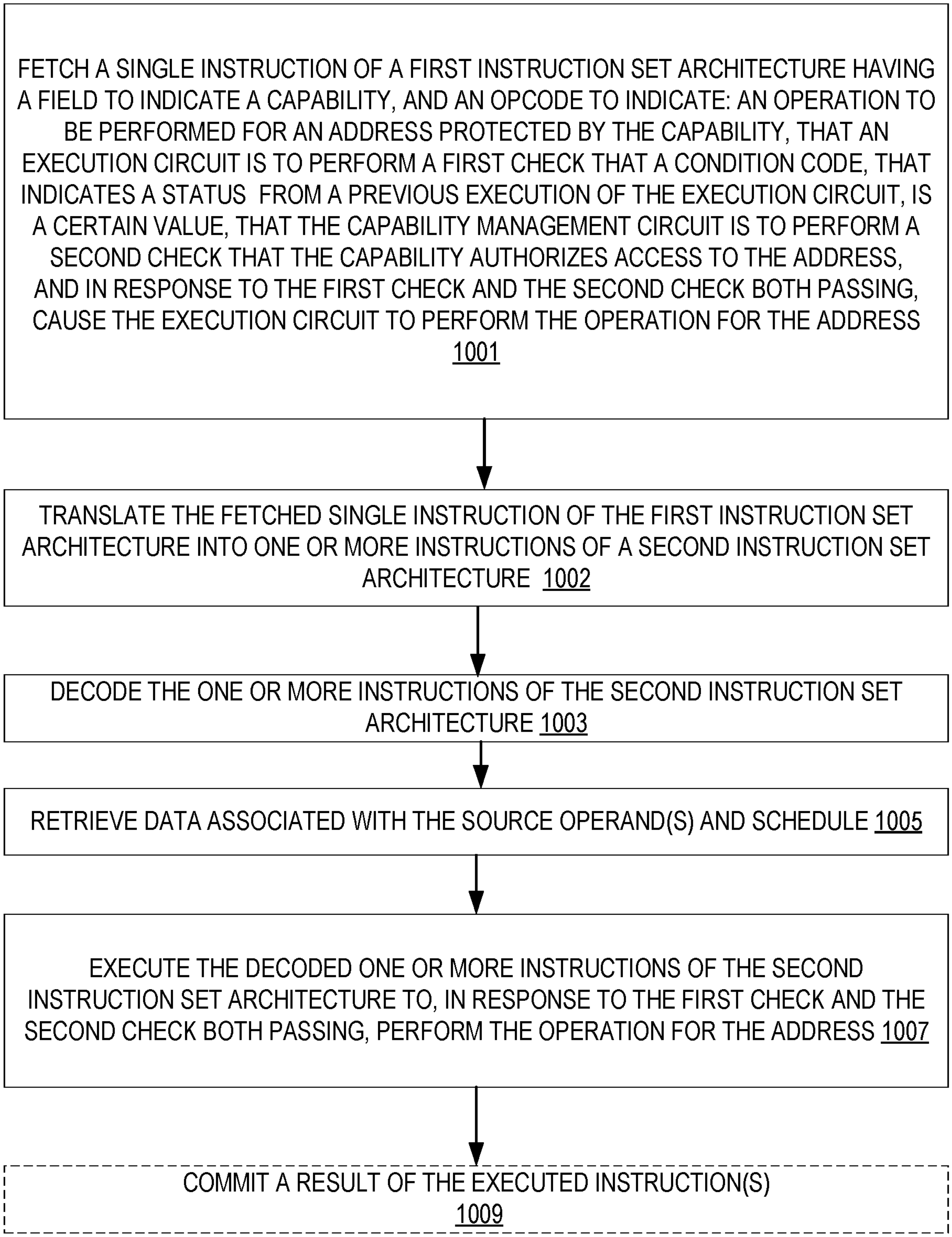
FIG. 10 illustrates an example method to process a PREDICATED CAPABILITY instruction using emulation or binary translation.

FIG. 10 illustrates an example method to process a PREDICATED CAPABILITY instruction using emulation or binary translation. For example, a processor core as shown in FIG. 13B, a pipeline and/or emulation/translation layer perform aspects of this method.

An instance of a single instruction of a first instruction set architecture is fetched at 1001. The instance of the single instruction of the first instruction set architecture includes fields as discussed herein. In some examples, the instruction further includes a field for a writemask. In some examples, the instruction is fetched from an instruction cache.

Figure 22:
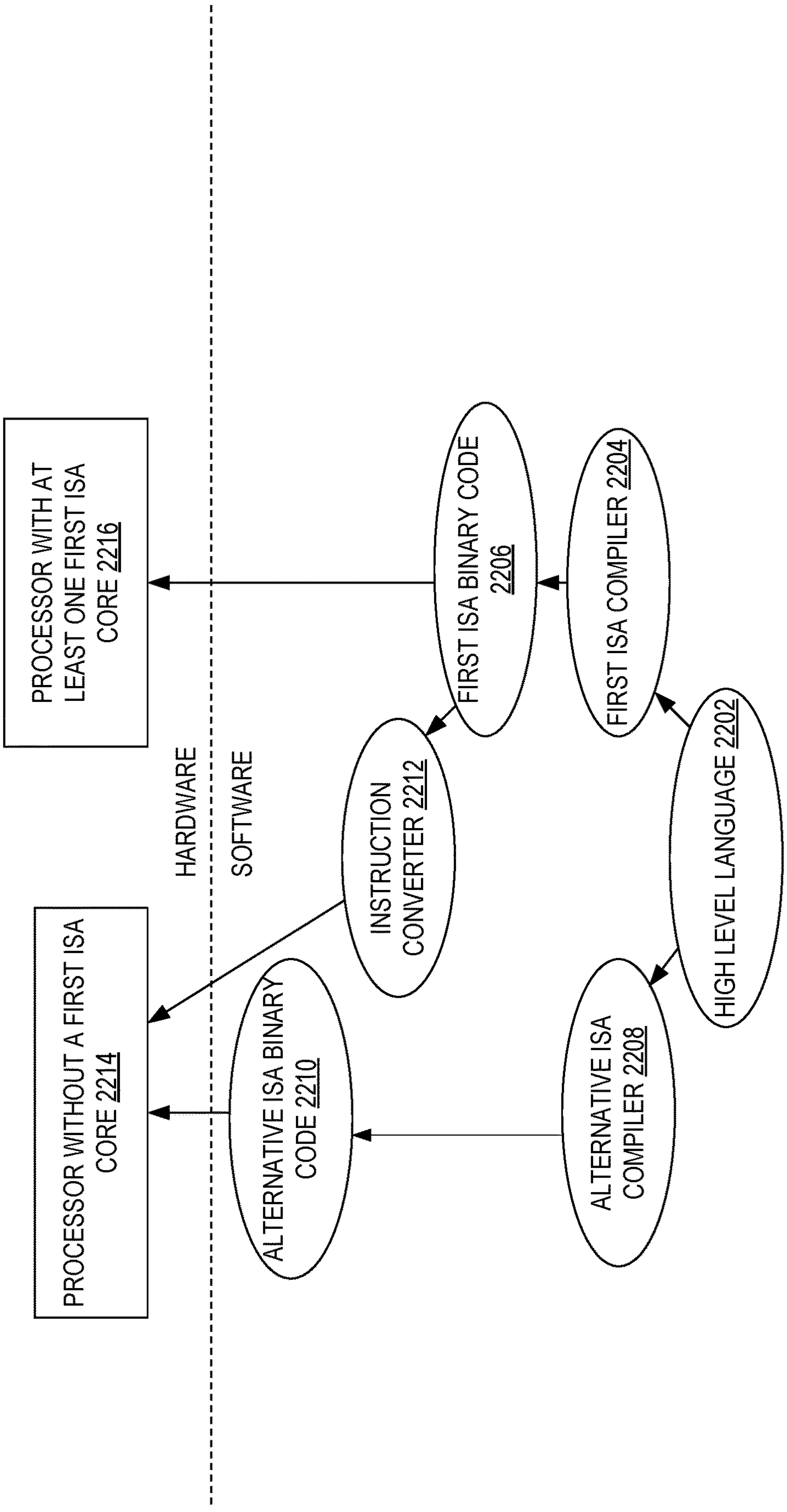
FIG. 22 is a block diagram illustrating the use of a software instruction converter to convert binary instructions in a source instruction set architecture to binary instructions in a target instruction set architecture according to examples.

The fetched single instruction of the first instruction set architecture is translated into one or more instructions of a second instruction set architecture at 1002. This translation is performed by a translation and/or emulation layer of software in some examples. In some examples, this translation is performed by an instruction converter 2212 as shown in FIG. 22. In some examples, the translation is performed by hardware translation circuitry.

The one or more translated instructions of the second instruction set architecture are decoded at 1003. For example, the translated instructions are decoded by decoder circuitry such as decoder circuitry 806 or decode circuitry 1340 detailed herein. In some examples, the operations of translation and decoding at 1002 and 1003 are merged.

Data values associated with the source operand(s) of the decoded one or more instructions of the second instruction set architecture are retrieved and the one or more instructions are scheduled at 1005. For example, when one or more of the source operands are memory operands, the data from the indicated memory location is retrieved.

At 1007, the decoded instruction(s) of the second instruction set architecture is/are executed by execution circuitry (hardware) such as execution circuit 106 shown in FIG. 1, execution circuitry 810 shown in FIG. 8, or execution cluster(s) 1360 shown in FIG. 13B, to perform the operation(s) indicated by the opcode of the single instruction of the first instruction set architecture. For the PREDICATED CAPABILITY instruction, the execution will cause execution circuitry to perform the operations described herein.

In some examples, the instruction is committed or retired at 1009.

Example Computer Architectures.

Detailed below are descriptions of example computer architectures. Other system designs and configurations known in the arts for laptop, desktop, and handheld personal computers (PC)s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Figure 11:
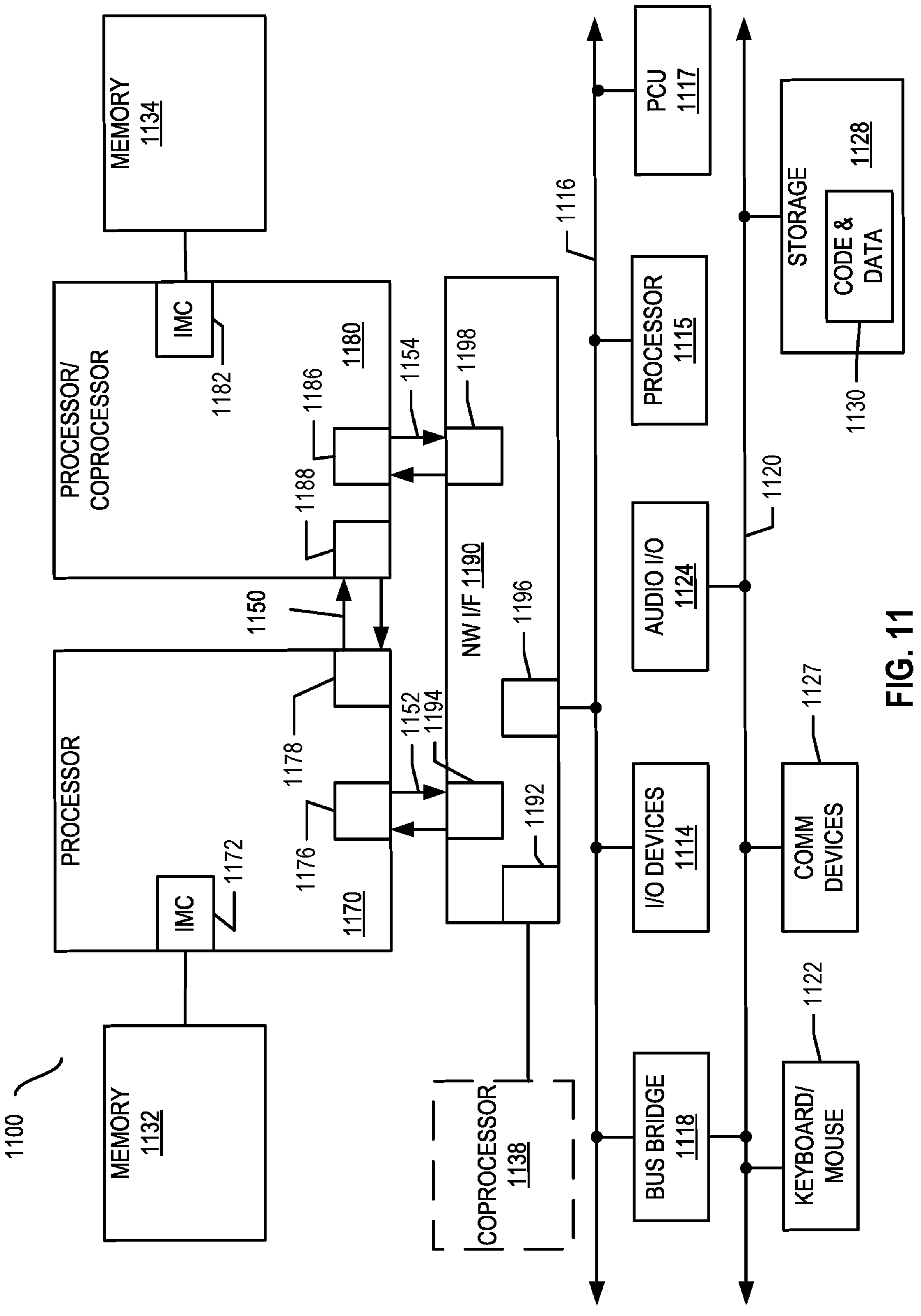
FIG. 11 illustrates an example computing system.

FIG. 11 illustrates an example computing system. Multiprocessor system 1100 is an interfaced system and includes a plurality of processors or cores including a first processor 1170 and a second processor 1180 coupled via an interface 1150 such as a point-to-point (P-P) interconnect, a fabric, and/or bus. In some examples, the first processor 1170 and the second processor 1180 are homogeneous. In some examples, first processor 1170 and the second processor 1180 are heterogenous. Though the example system 1100 is shown to have two processors, the system may have three or more processors, or may be a single processor system. In some examples, the computing system is a system on a chip (SoC).

Processors 1170 and 1180 are shown including integrated memory controller (IMC) circuitry 1172 and 1182, respectively. Processor 1170 also includes interface circuits 1176 and 1178; similarly, second processor 1180 includes interface circuits 1186 and 1188. Processors 1170, 1180 may exchange information via the interface 1150 using interface circuits 1178, 1188. IMCs 1172 and 1182 couple the processors 1170, 1180 to respective memories, namely a memory 1132 and a memory 1134, which may be portions of main memory locally attached to the respective processors.

Processors 1170, 1180 may each exchange information with a network interface (NW I/F) 1190 via individual interfaces 1152, 1154 using interface circuits 1176, 1194, 1186, 1198. The network interface 1190 (e.g., one or more of an interconnect, bus, and/or fabric, and in some examples is a chipset) may optionally exchange information with a coprocessor 1138 via an interface circuit 1192. In some examples, the coprocessor 1138 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 1170, 1180 or outside of both processors, yet connected with the processors via an interface such as P-P interconnect, such that either or both processors' local cache information may be stored in the shared cache if a processor is placed into a low power mode.

Network interface 1190 may be coupled to a first interface 1116 via interface circuit 1196. In some examples, first interface 1116 may be an interface such as a Peripheral Component Interconnect (PCI) interconnect, a PCI Express interconnect or another I/O interconnect. In some examples, first interface 1116 is coupled to a power control unit (PCU) 1117, which may include circuitry, software, and/or firmware to perform power management operations with regard to the processors 1170, 1180 and/or co-processor 1138. PCU 1117 provides control information to a voltage regulator (not shown) to cause the voltage regulator to generate the appropriate regulated voltage. PCU 1117 also provides control information to control the operating voltage generated. In various examples, PCU 1117 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 1117 is illustrated as being present as logic separate from the processor 1170 and/or processor 1180. In other cases, PCU 1117 may execute on a given one or more of cores (not shown) of processor 1170 or 1180. In some cases, PCU 1117 may be implemented as a microcontroller (dedicated or general-purpose) or other control logic configured to execute its own dedicated power management code, sometimes referred to as P-code. In yet other examples, power management operations to be performed by PCU 1117 may be implemented externally to a processor, such as by way of a separate power management integrated circuit (PMIC) or another component external to the processor. In yet other examples, power management operations to be performed by PCU 1117 may be implemented within BIOS or other system software.

Various I/O devices 1114 may be coupled to first interface 1116, along with a bus bridge 1118 which couples first interface 1116 to a second interface 1120. In some examples, one or more additional processor(s) 1115, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 1116. In some examples, second interface 1120 may be a low pin count (LPC) interface. Various devices may be coupled to second interface 1120 including, for example, a keyboard and/or mouse 1122, communication devices 1127 and storage circuitry 1128. Storage circuitry 1128 may be one or more non-transitory machine-readable storage media as described below, such as a disk drive or other mass storage device which may include instructions/code and data 1130 and may implement the storage 802 in some examples. Further, an audio I/O 1124 may be coupled to second interface 1120. Note that other architectures than the point-to-point architecture described above are possible. For example, instead of the point-to-point architecture, a system such as multiprocessor system 1100 may implement a multi-drop interface or other such architecture.

Example Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 12:
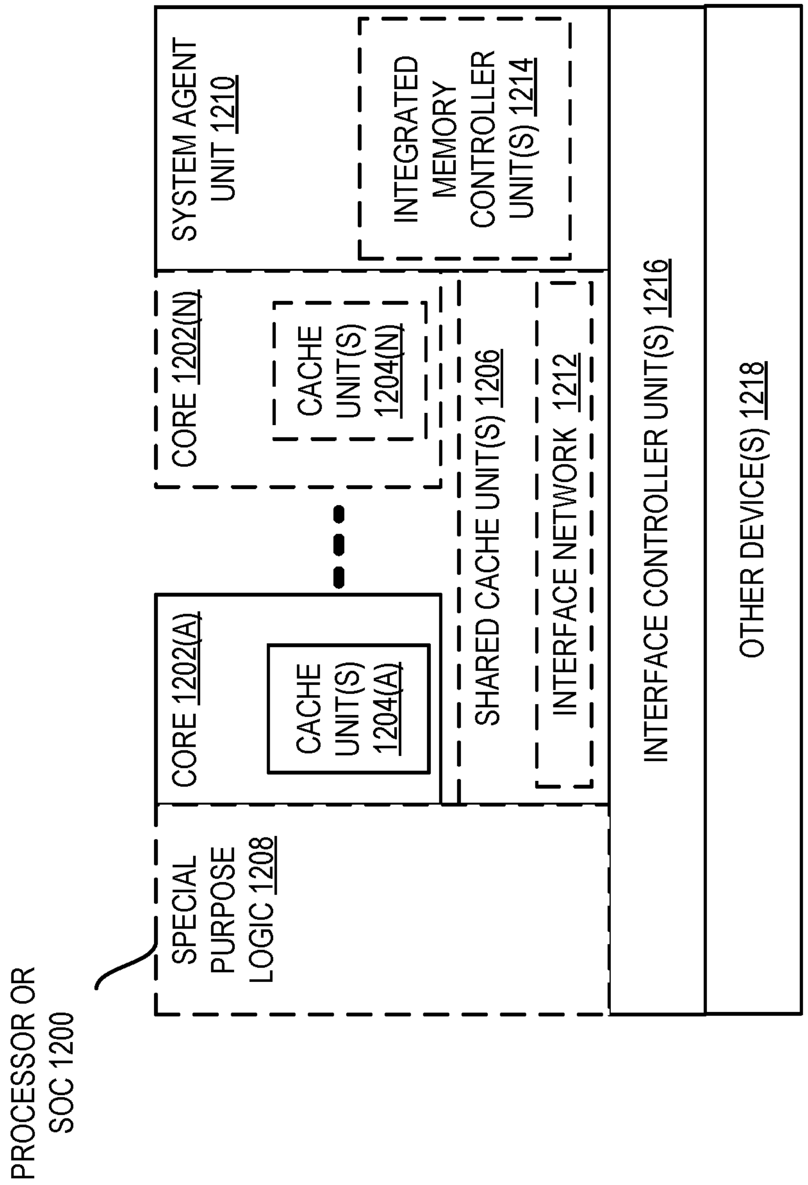
FIG. 12 illustrates a block diagram of an example processor and/or System on a Chip (SoC) that may have one or more cores and an integrated memory controller.

FIG. 12 illustrates a block diagram of an example processor and/or SoC 1200 that may have one or more cores and an integrated memory controller. The solid lined boxes illustrate a processor 1200 with a single core 1202(A), system agent unit circuitry 1210, and a set of one or more interface controller unit(s) circuitry 1216, while the optional addition of the dashed lined boxes illustrates an alternative processor 1200 with multiple cores 1202(A)-(N), a set of one or more integrated memory controller unit(s) circuitry 1214 in the system agent unit circuitry 1210, and special purpose logic 1208, as well as a set of one or more interface controller units circuitry 1216. Note that the processor 1200 may be one of the processors 1170 or 1180, or co-processor 1138 or 1115 of FIG. 11.

Thus, different implementations of the processor 1200 may include: 1) a CPU with the special purpose logic 1208 being integrated graphics and/or scientific (throughput) logic (which may include one or more cores, not shown), and the cores 1202(A)-(N) being one or more general purpose cores (e.g., general purpose in-order cores, general purpose out-of-order cores, or a combination of the two); 2) a coprocessor with the cores 1202(A)-(N) being a large number of special purpose cores intended primarily for graphics and/or scientific (throughput); and 3) a coprocessor with the cores 1202(A)-(N) being a large number of general purpose in-order cores. Thus, the processor 1200 may be a general-purpose processor, coprocessor, or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1204(A)-(N) within the cores 1202(A)-(N), a set of one or more shared cache unit(s) circuitry 1206, and external memory (not shown) coupled to the set of integrated memory controller unit(s) circuitry 1214. The set of one or more shared cache unit(s) circuitry 1206 may include one or more mid-level caches, such as level 2 (L2), level 3 (L3), level 4 (L4), or other levels of cache, such as a last level cache (LLC), and/or combinations thereof. While in some examples interface network circuitry 1212 (e.g., a ring interconnect) interfaces the special purpose logic 1208 (e.g., integrated graphics logic), the set of shared cache unit(s) circuitry 1206, and the system agent unit circuitry 1210, alternative examples use any number of well-known techniques for interfacing such units. In some examples, coherency is maintained between one or more of the shared cache unit(s) circuitry 1206 and cores 1202(A)-(N). In some examples, interface controller units circuitry 1216 couple the cores 1202 to one or more other devices 1218 such as one or more I/O devices, storage, one or more communication devices (e.g., wireless networking, wired networking, etc.), etc.

In some examples, one or more of the cores 1202(A)-(N) are capable of multi-threading. The system agent unit circuitry 1210 includes those components coordinating and operating cores 1202(A)-(N). The system agent unit circuitry 1210 may include, for example, power control unit (PCU) circuitry and/or display unit circuitry (not shown). The PCU may be or may include logic and components needed for regulating the power state of the cores 1202(A)-(N) and/or the special purpose logic 1208 (e.g., integrated graphics logic). The display unit circuitry is for driving one or more externally connected displays.

The cores 1202(A)-(N) may be homogenous in terms of instruction set architecture (ISA). Alternatively, the cores 1202(A)-(N) may be heterogeneous in terms of ISA; that is, a subset of the cores 1202(A)-(N) may be capable of executing an ISA, while other cores may be capable of executing only a subset of that ISA or another ISA.

Example Core Architectures—in-Order and Out-of-Order Core Block Diagram.

Figure 13A:
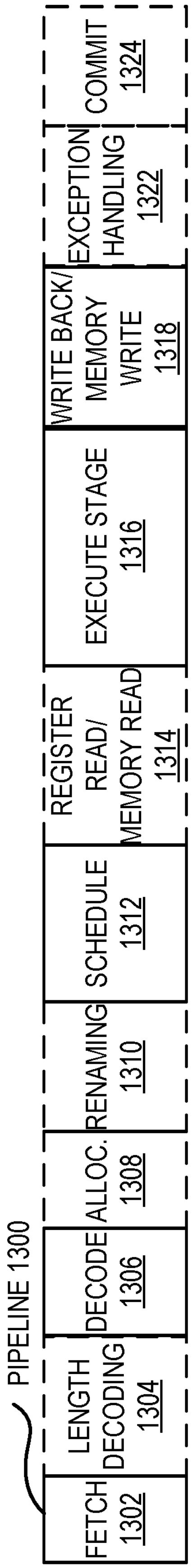
FIG. 13A is a block diagram illustrating both an example in-order pipeline and an example register renaming, out-of-order issue/execution pipeline according to examples.
Figure 13B:
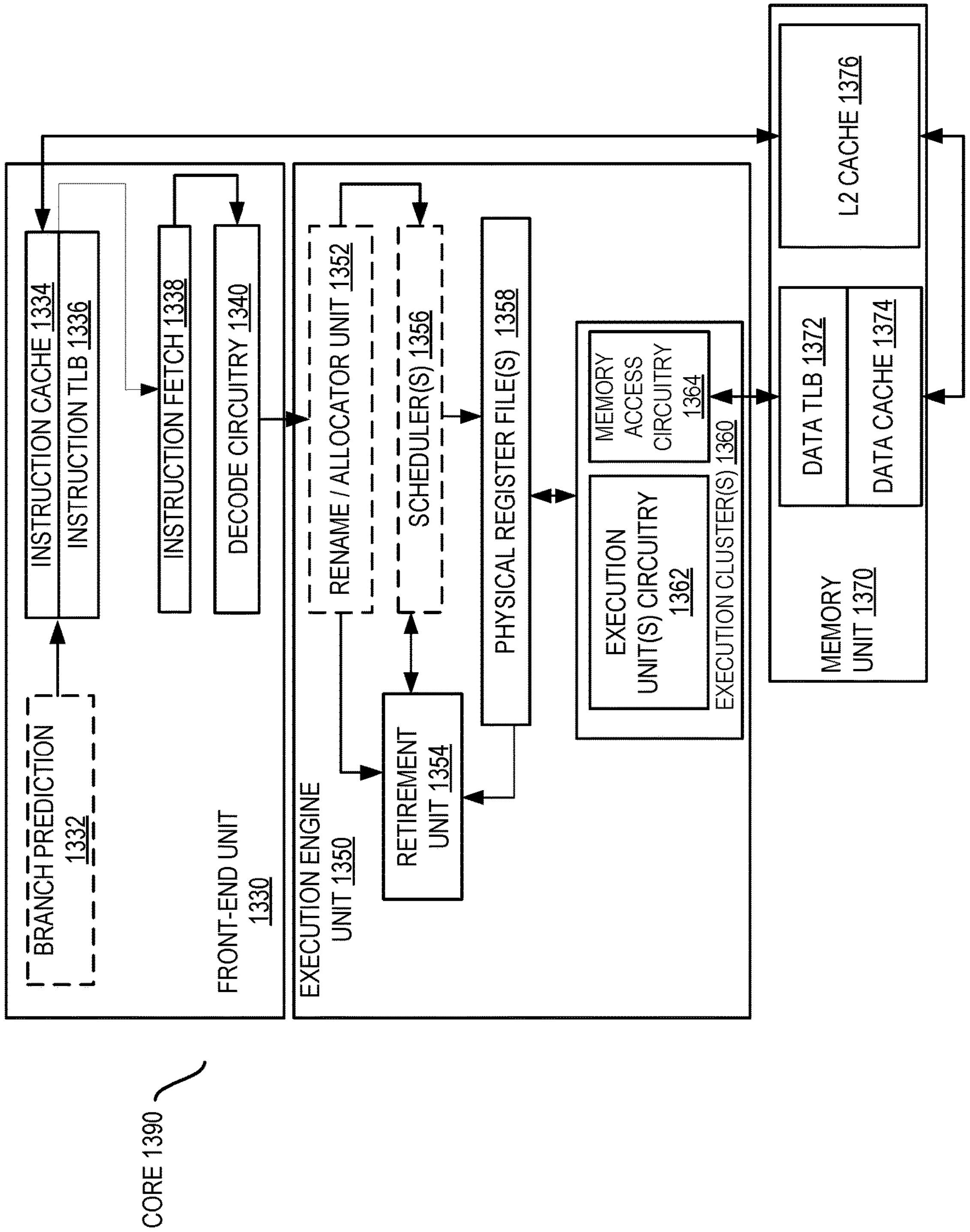
FIG. 13B is a block diagram illustrating both an example in-order architecture core and an example register renaming, out-of-order issue/execution architecture core to be included in a processor according to examples.

FIG. 13A is a block diagram illustrating both an example in-order pipeline and an example register renaming, out-of-order issue/execution pipeline according to examples. FIG. 13B is a block diagram illustrating both an example in-order architecture core and an example register renaming, out-of-order issue/execution architecture core to be included in a processor according to examples. The solid lined boxes in FIGS. 13A-13B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, an optional length decoding stage 1304, a decode stage 1306, an optional allocation (Alloc) stage 1308, an optional renaming stage 1310, a schedule (also known as a dispatch or issue) stage 1312, an optional register read/memory read stage 1314, an execute stage 1316, a write back/memory write stage 1318, an optional exception handling stage 1322, and an optional commit stage 1324. One or more operations can be performed in each of these processor pipeline stages. For example, during the fetch stage 1302, one or more instructions are fetched from instruction memory, and during the decode stage 1306, the one or more fetched instructions may be decoded, addresses (e.g., load store unit (LSU) addresses) using forwarded register ports may be generated, and branch forwarding (e.g., immediate offset or a link register (LR)) may be performed. In one example, the decode stage 1306 and the register read/memory read stage 1314 may be combined into one pipeline stage. In one example, during the execute stage 1316, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 13B may implement the pipeline 1300 as follows: 1) the instruction fetch circuitry 1338 performs the fetch and length decoding stages 1302 and 1304; 2) the decode circuitry 1340 performs the decode stage 1306; 3) the rename/allocator unit circuitry 1352 performs the allocation stage 1308 and renaming stage 1310; 4) the scheduler(s) circuitry 1356 performs the schedule stage 1312; 5) the physical register file(s) circuitry 1358 and the memory unit circuitry 1370 perform the register read/memory read stage 1314; the execution cluster(s) 1360 perform the execute stage 1316; 6) the memory unit circuitry 1370 and the physical register file(s) circuitry 1358 perform the write back/memory write stage 1318; 7) various circuitry may be involved in the exception handling stage 1322; and 8) the retirement unit circuitry 1354 and the physical register file(s) circuitry 1358 perform the commit stage 1324.

FIG. 13B shows a processor core 1390 including front-end unit circuitry 1330 coupled to execution engine unit circuitry 1350, and both are coupled to memory unit circuitry 1370. The core 1390 may be a reduced instruction set architecture computing (RISC) core, a complex instruction set architecture computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front-end unit circuitry 1330 may include branch prediction circuitry 1332 coupled to instruction cache circuitry 1334, which is coupled to an instruction translation lookaside buffer (TLB) 1336, which is coupled to instruction fetch circuitry 1338, which is coupled to decode circuitry 1340. In one example, the instruction cache circuitry 1334 is included in the memory unit circuitry 1370 rather than the front-end circuitry 1330. The decode circuitry 1340 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1340 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1340 may be implemented using various different mechanisms. Examples of suitable mechanisms include, but are not limited to, look-up tables, hardware implementations, programmable logic arrays (PLAs), microcode read only memories (ROMs), etc. In one example, the core 1390 includes a microcode ROM (not shown) or other medium that stores microcode for certain macroinstructions (e.g., in decode circuitry 1340 or otherwise within the front-end circuitry 1330). In one example, the decode circuitry 1340 includes a micro-operation (micro-op) or operation cache (not shown) to hold/cache decoded operations, micro-tags, or micro-operations generated during the decode or other stages of the processor pipeline 1300. The decode circuitry 1340 may be coupled to rename/allocator unit circuitry 1352 in the execution engine circuitry 1350.

The execution engine circuitry 1350 includes the rename/allocator unit circuitry 1352 coupled to retirement unit circuitry 1354 and a set of one or more scheduler(s) circuitry 1356. The scheduler(s) circuitry 1356 represents any number of different schedulers, including reservations stations, central instruction window, etc. In some examples, the scheduler(s) circuitry 1356 can include arithmetic logic unit (ALU) scheduler/scheduling circuitry, ALU queues, address generation unit (AGU) scheduler/scheduling circuitry, AGU queues, etc. The scheduler(s) circuitry 1356 is coupled to the physical register file(s) circuitry 1358. Each of the physical register file(s) circuitry 1358 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1358 includes vector registers unit circuitry, writemask registers unit circuitry, and scalar register unit circuitry. These register units may provide architectural vector registers, vector mask registers, general-purpose registers, etc. The physical register file(s) circuitry 1358 is coupled to the retirement unit circuitry 1354 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1354 and the physical register file(s) circuitry 1358 are coupled to the execution cluster(s) 1360. The execution cluster(s) 1360 includes a set of one or more execution unit(s) circuitry 1362 and a set of one or more memory access circuitry 1364. The execution unit(s) circuitry 1362 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1356, physical register file(s) circuitry 1358, and execution cluster(s) 1360 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1364). It should also be understood that where separate pipelines are used, one or more of these pipelines may be out-of-order issue/execution and the rest in-order.

In some examples, the execution engine unit circuitry 1350 may perform load store unit (LSU) address/data pipelining to an Advanced Microcontroller Bus (AMB) interface (not shown), and address phase and writeback, data phase load, store, and branches.

The set of memory access circuitry 1364 is coupled to the memory unit circuitry 1370, which includes data TLB circuitry 1372 coupled to data cache circuitry 1374 coupled to level 2 (L2) cache circuitry 1376. In one example, the memory access circuitry 1364 may include load unit circuitry, store address unit circuitry, and store data unit circuitry, each of which is coupled to the data TLB circuitry 1372 in the memory unit circuitry 1370. The instruction cache circuitry 1334 is further coupled to the level 2 (L2) cache circuitry 1376 in the memory unit circuitry 1370. In one example, the instruction cache 1334 and the data cache 1374 are combined into a single instruction and data cache (not shown) in L2 cache circuitry 1376, level 3 (L3) cache circuitry (not shown), and/or main memory. The L2 cache circuitry 1376 is coupled to one or more other levels of cache and eventually to a main memory.

The core 1390 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In one example, the core 1390 includes logic to support a packed data instruction set architecture extension (e.g., AVX1, AVX2), thereby allowing the operations used by many multimedia applications to be performed using packed data.

Example Execution Unit(s) Circuitry.

Figure 14:
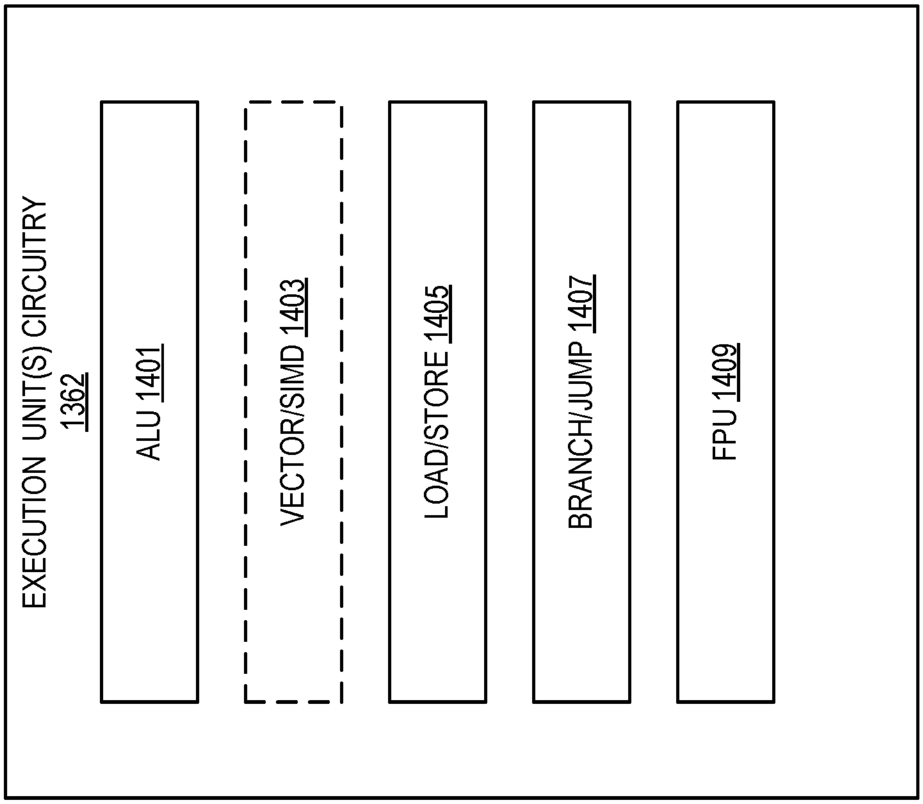
FIG. 14 illustrates examples of execution unit(s) circuitry.

FIG. 14 illustrates examples of execution unit(s) circuitry, such as execution unit(s) circuitry 1362 of FIG. 13B. As illustrated, execution unit(s) circuitry 1362 may include one or more ALU circuits 1401, optional vector/single instruction multiple data (SIMD) circuits 1403, load/store circuits 1405, branch/jump circuits 1407, and/or Floating-point unit (FPU) circuits 1409. ALU circuits 1401 perform integer arithmetic and/or Boolean operations. Vector/SIMD circuits 1403 perform vector/SIMD operations on packed data (such as SIMD/vector registers). Load/store circuits 1405 execute load and store instructions to load data from memory into registers or store from registers to memory. Load/store circuits 1405 may also generate addresses. Branch/jump circuits 1407 cause a branch or jump to a memory address depending on the instruction. FPU circuits 1409 perform floating-point arithmetic. The width of the execution unit(s) circuitry 1362 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture.

Figure 15:
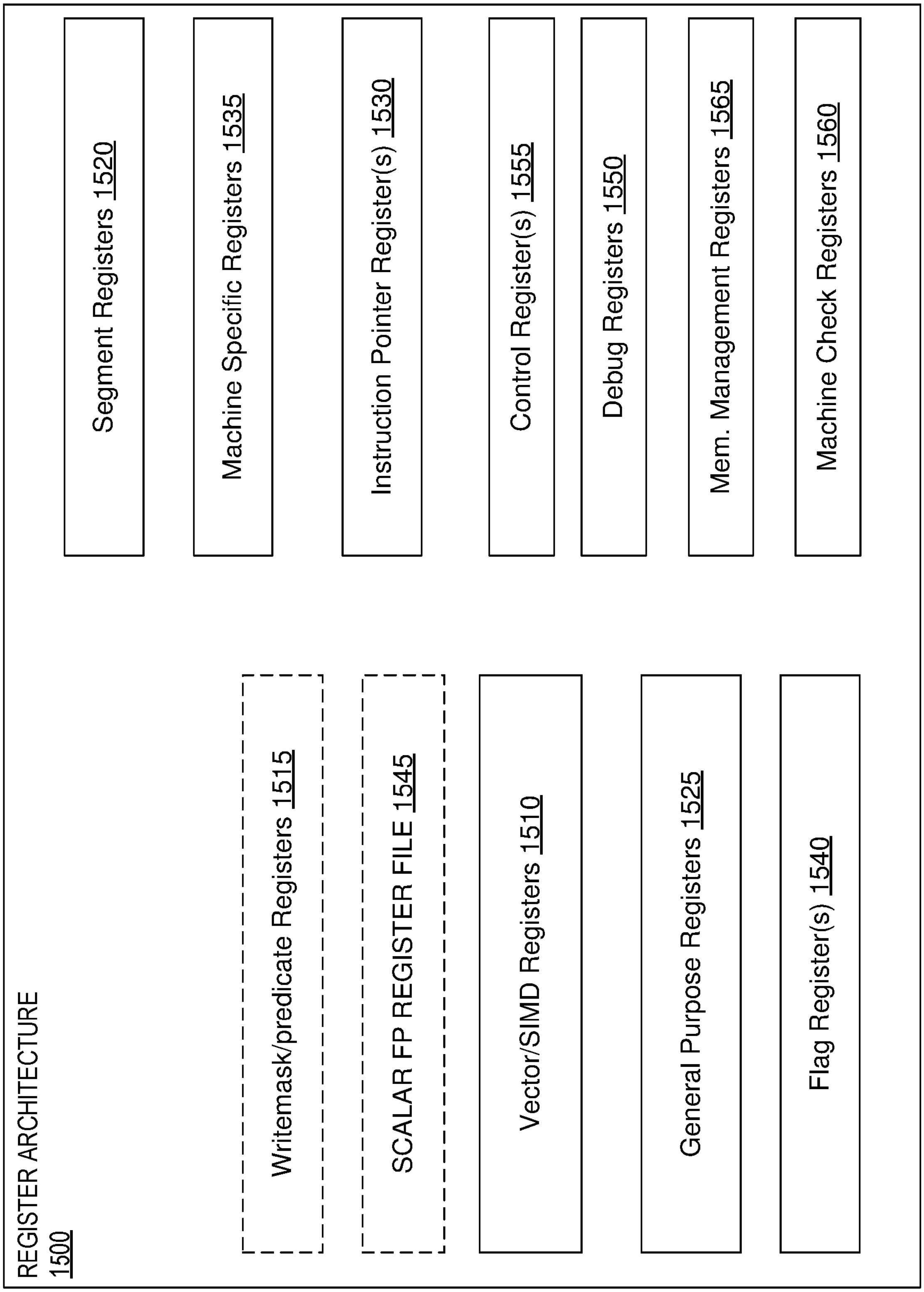
FIG. 15 is a block diagram of a register architecture according to some examples.

FIG. 15 is a block diagram of a register architecture 1500 according to some examples. As illustrated, the register architecture 1500 includes vector/SIMD registers 1510 that vary from 128-bit to 1,024 bits width. In some examples, the vector/SIMD registers 1510 are physically 512-bits and, depending upon the mapping, only some of the lower bits are used. For example, in some examples, the vector/SIMD registers 1510 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1500 includes writemask/predicate registers 1515. For example, in some examples, there are 8 writemask/predicate registers (sometimes called k0 through k7) that are each 16-bit, 32-bit, 64-bit, or 128-bit in size. Writemask/predicate registers 1515 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1515 corresponds to a data element position of the destination. In other examples, the writemask/predicate registers 1515 are scalable and consists of a set number of enable bits for a given vector element (e.g., 8 enable bits per 64-bit vector element).

The register architecture 1500 includes a plurality of general-purpose registers 1525. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1500 includes scalar floating-point (FP) register file 1545 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1540 (e.g., EFLAGS, RFLAGS, etc.) store status and control information for arithmetic, compare, and system operations. For example, the one or more flag registers 1540 may store condition code information such as carry, parity, auxiliary carry, zero, sign, and overflow. In some examples, the one or more flag registers 1540 are called program status and control registers.

Segment registers 1520 contain segment points for use in accessing memory. In some examples, these registers are referenced by the names CS, DS, SS, ES, FS, and GS.

Machine specific registers (MSRs) 1535 control and report on processor performance. Most MSRs 1535 handle system-related functions and are not accessible to an application program. Machine check registers 1560 consist of control, status, and error reporting MSRs that are used to detect and report on hardware errors.

One or more instruction pointer register(s) 1530 store an instruction pointer value. Control register(s) 1555 (e.g., CR0-CR4) determine the operating mode of a processor (e.g., processor 1170, 1180, 1138, 1115, and/or 1200) and the characteristics of a currently executing task. Debug registers 1550 control and allow for the monitoring of a processor or core's debugging operations.

Memory (mem) management registers 1565 specify the locations of data structures used in protected mode memory management. These registers may include a global descriptor table register (GDTR), interrupt descriptor table register (IDTR), task register, and a local descriptor table register (LDTR) register.

Alternative examples may use wider or narrower registers. Additionally, alternative examples may use more, less, or different register files and registers. The register architecture 1500 may, for example, be used in register file 112 and/or memory 134, or physical register file(s) circuitry 1358.

Instruction Set Architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Example Instruction Formats.

Examples of the instruction(s) described herein may be embodied in different formats. Additionally, example systems, architectures, and pipelines are detailed below. Examples of the instruction(s) may be executed on such systems, architectures, and pipelines, but are not limited to those detailed.

Figure 16:
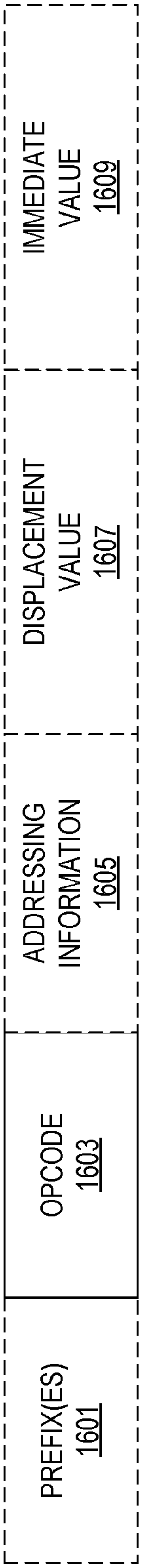
FIG. 16 illustrates examples of an instruction format.

FIG. 16 illustrates examples of an instruction format. As illustrated, an instruction may include multiple components including, but not limited to, one or more fields for: one or more prefixes 1601, an opcode 1603, addressing information 1605 (e.g., register identifiers, memory addressing information, etc.), a displacement value 1607, and/or an immediate value 1609. Note that some instructions utilize some or all the fields of the format whereas others may only use the field for the opcode 1603. In some examples, the order illustrated is the order in which these fields are to be encoded, however, it should be appreciated that in other examples these fields may be encoded in a different order, combined, etc.

The prefix(es) field(s) 1601, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1603 is used to at least partially define the operation to be performed upon a decoding of the instruction. In some examples, a primary opcode encoded in the opcode field 1603 is one, two, or three bytes in length. In other examples, a primary opcode can be a different length. An additional 3-bit opcode field is sometimes encoded in another field.

Figure 17:
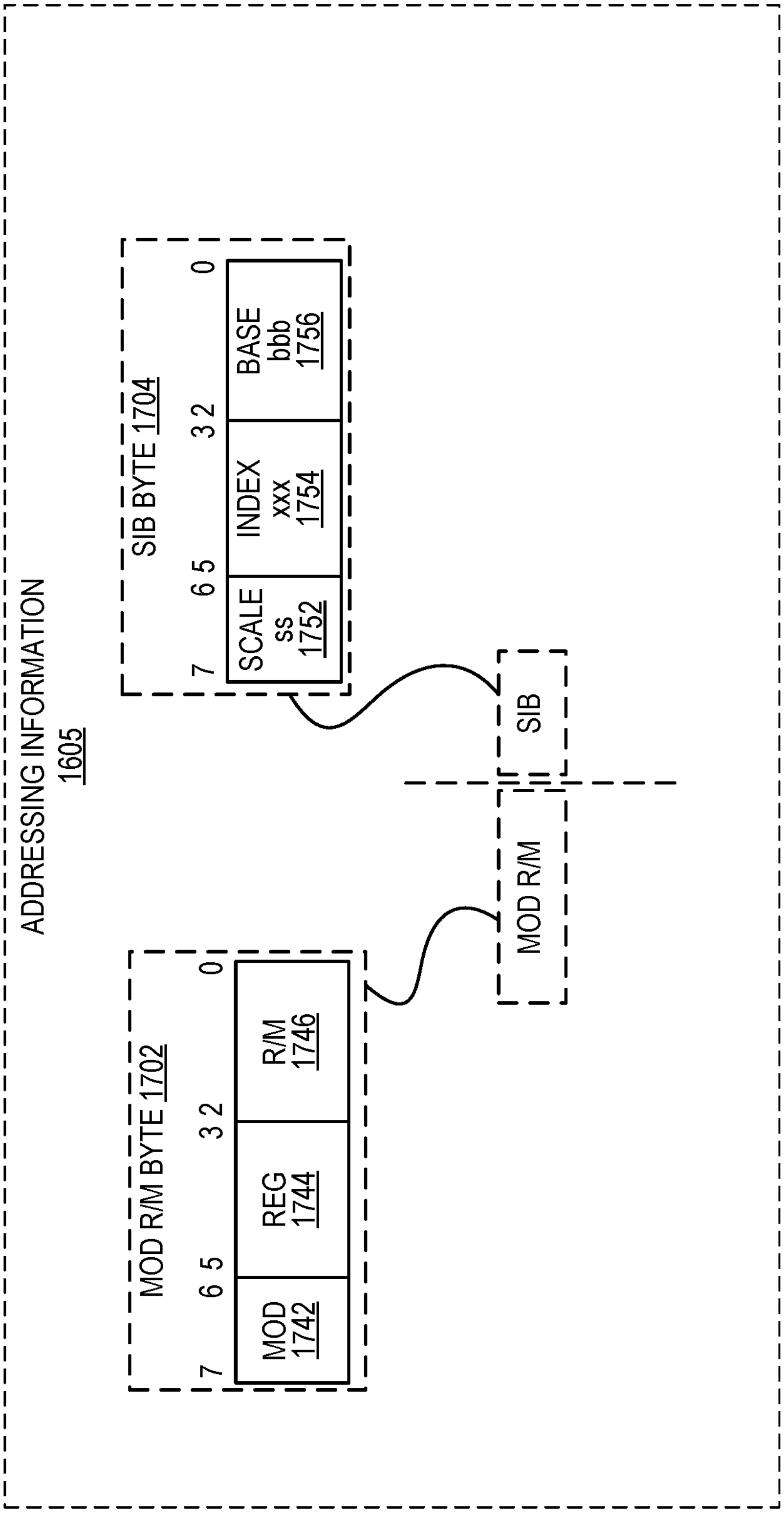
FIG. 17 illustrates examples of an addressing information field.

The addressing information field 1605 is used to address one or more operands of the instruction, such as a location in memory or one or more registers. FIG. 17 illustrates examples of the addressing information field 1605. In this illustration, an optional MOD R/M byte 1702 and an optional Scale, Index, Base (SIB) byte 1704 are shown. The MOD R/M byte 1702 and the SIB byte 1704 are used to encode up to two operands of an instruction, each of which is a direct register or effective memory address. Note that both of these fields are optional in that not all instructions include one or more of these fields. The MOD R/M byte 1702 includes a MOD field 1742, a register (reg) field 1744, and R/M field 1746.

The content of the MOD field 1742 distinguishes between memory access and non-memory access modes. In some examples, when the MOD field 1742 has a binary value of 11 (11$b$), a register-direct addressing mode is utilized, and otherwise a register-indirect addressing mode is used.

The register field 1744 may encode either the destination register operand or a source register operand or may encode an opcode extension and not be used to encode any instruction operand. The content of register field 1744, directly or through address generation, specifies the locations of a source or destination operand (either in a register or in memory). In some examples, the register field 1744 is supplemented with an additional bit from a prefix (e.g., prefix 1601) to allow for greater addressing.

The R/M field 1746 may be used to encode an instruction operand that references a memory address or may be used to encode either the destination register operand or a source register operand. Note the R/M field 1746 may be combined with the MOD field 1742 to dictate an addressing mode in some examples.

The SIB byte 1704 includes a scale field 1752, an index field 1754, and a base field 1756 to be used in the generation of an address. The scale field 1752 indicates a scaling factor. The index field 1754 specifies an index register to use. In some examples, the index field 1754 is supplemented with an additional bit from a prefix (e.g., prefix 1601) to allow for greater addressing. The base field 1756 specifies a base register to use. In some examples, the base field 1756 is supplemented with an additional bit from a prefix (e.g., prefix 1601) to allow for greater addressing. In practice, the content of the scale field 1752 allows for the scaling of the content of the index field 1754 for memory address generation (e.g., for address generation that uses $2^{scale}$*index+base).

Some addressing forms utilize a displacement value to generate a memory address. For example, a memory address may be generated according to $2^{scale}$*index+base+displacement, index*scale+displacement, r/m+displacement, instruction pointer (RIP/EIP)+displacement, register+displacement, etc. The displacement may be a 1-byte, 2-byte, 4-byte, etc. value. In some examples, the displacement field 1607 provides this value. Additionally, in some examples, a displacement factor usage is encoded in the MOD field of the addressing information field 1605 that indicates a compressed displacement scheme for which a displacement value is calculated and stored in the displacement field 1607.

In some examples, the immediate value field 1609 specifies an immediate value for the instruction. An immediate value may be encoded as a 1-byte value, a 2-byte value, a 4-byte value, etc.

Figure 18:
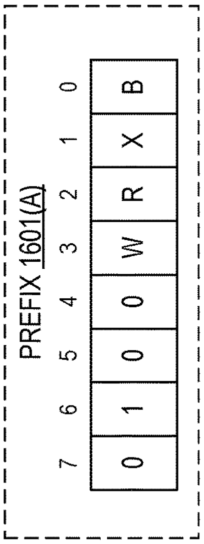
FIG. 18 illustrates examples of a first prefix.

FIG. 18 illustrates examples of a first prefix 1601(A). In some examples, the first prefix 1601(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1601(A) may specify up to three registers using 3-bit fields depending on the format: 1) using the reg field 1744 and the R/M field 1746 of the MOD R/M byte 1702; 2) using the MOD R/M byte 1702 with the SIB byte 1704 including using the reg field 1744 and the base field 1756 and index field 1754; or 3) using the register field of an opcode.

In the first prefix 1601(A), bit positions 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 (24) registers to be addressed, whereas the MOD R/M reg field 1744 and MOD R/M R/M field 1746 alone can each only address 8 registers.

In the first prefix 1601(A), bit position 2 (R) may be an extension of the MOD R/M reg field 1744 and may be used to modify the MOD R/M reg field 1744 when that field encodes a general-purpose register, a 64-bit packed data register (e.g., an SSE register), or a control or debug register. R is ignored when MOD R/M byte 1702 specifies other registers or defines an extended opcode.

Bit position 1 (X) may modify the SIB byte index field 1754.

Bit position 0 (B) may modify the base in the MOD R/M R/M field 1746 or the SIB byte base field 1756; or it may modify the opcode register field used for accessing general purpose registers (e.g., general purpose registers 1525).

Figure 19A:
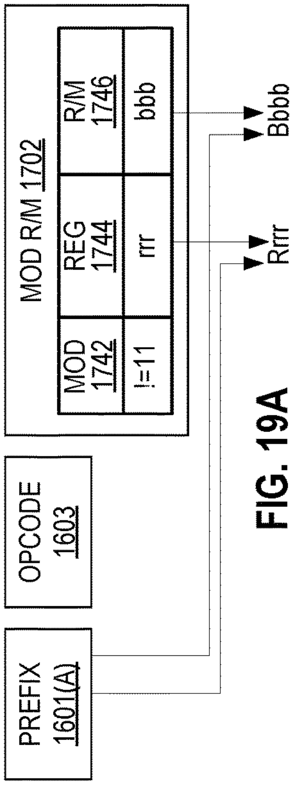
FIGS. 19A-19D illustrate examples of how the R, X, and B fields of the first prefix in FIG. 18 are used.
Figure 19B:
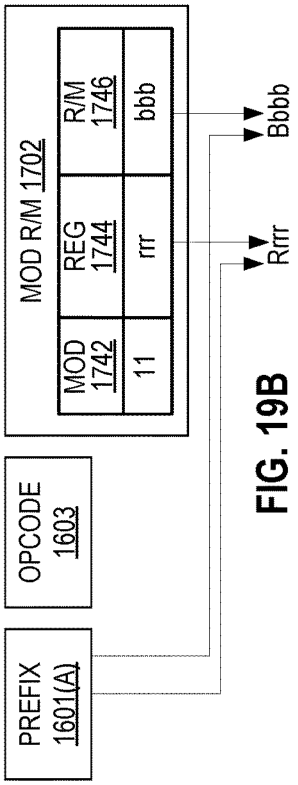
Figure 19C:
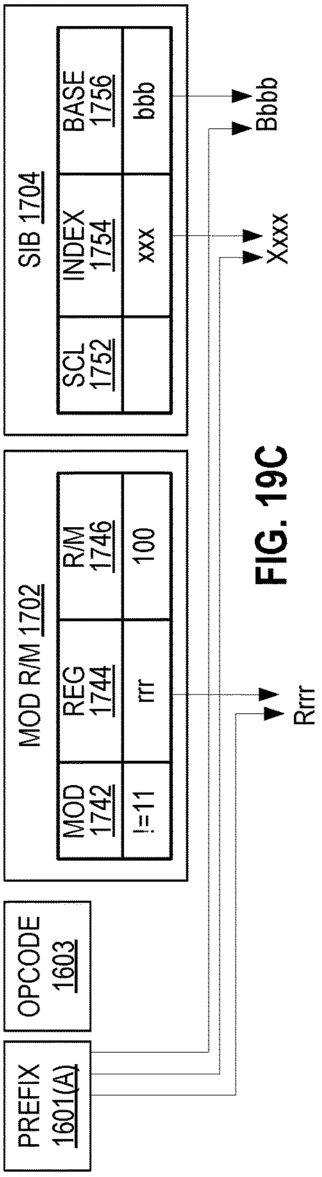
Figure 19D:
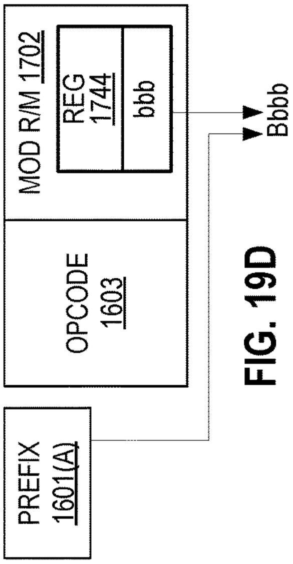

FIGS. 19A-19D illustrate examples of how the R, X, and B fields of the first prefix 1601(A) are used. FIG. 19A illustrates R and B from the first prefix 1601(A) being used to extend the reg field 1744 and R/M field 1746 of the MOD R/M byte 1702 when the SIB byte 17 04 is not used for memory addressing. FIG. 19(B) illustrates R and B from the first prefix 1601(A) being used to extend the reg field 1744 and R/M field 1746 of the MOD R/M byte 1702 when the SIB byte 17 04 is not used (register-register addressing). FIG. 19(C) illustrates R. X, and B from the first prefix 1601(A) being used to extend the reg field 1744 of the MOD R/M byte 1702 and the index field 1754 and base field 1756 when the SIB byte 17 04 being used for memory addressing. FIG. 19(D) illustrates B from the first prefix 1601(A) being used to extend the reg field 1744 of the MOD R/M byte 1702 when a register is encoded in the opcode 1603.

Figure 20A:
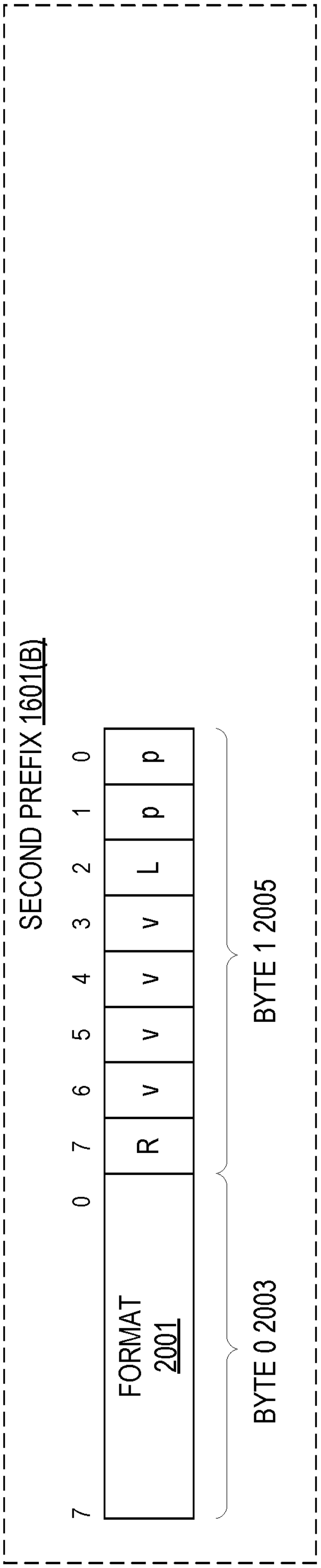
FIGS. 20A-20B illustrate examples of a second prefix.
Figure 20B:
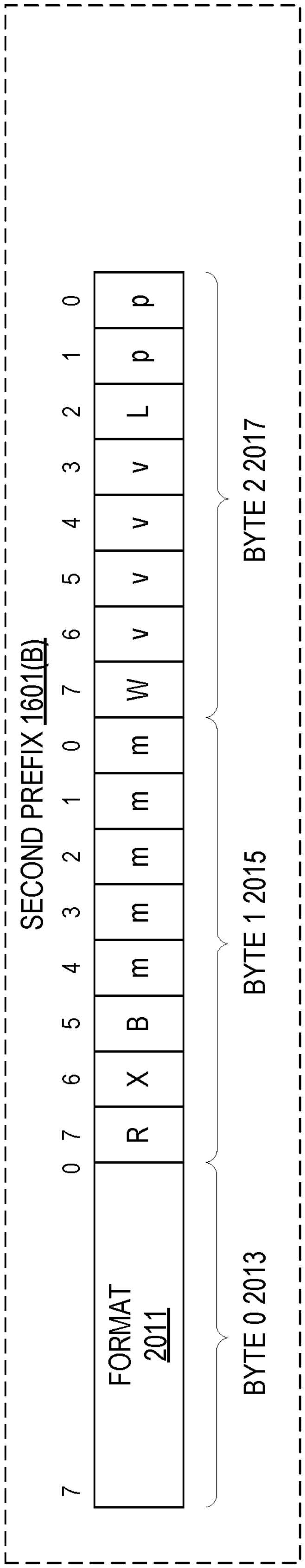

FIGS. 20A-20B illustrate examples of a second prefix 1601(B). In some examples, the second prefix 1601(B) is an example of a VEX prefix. The second prefix 1601(B) encoding allows instructions to have more than two operands, and allows SIMD vector registers (e.g., vector/SIMD registers 1510) to be longer than 64-bits (e.g., 128-bit and 256-bit). The use of the second prefix 1601(B) provides for three-operand (or more) syntax. For example, previous two-operand instructions performed operations such as A=A+B, which overwrites a source operand. The use of the second prefix 1601(B) enables operands to perform nondestructive operations such as A=B+C.

In some examples, the second prefix 1601(B) comes in two forms—a two-byte form and a three-byte form. The two-byte second prefix 1601(B) is used mainly for 128-bit, scalar, and some 256-bit instructions; while the three-byte second prefix 1601(B) provides a compact replacement of the first prefix 1601(A) and 3-byte opcode instructions.

FIG. 20A illustrates examples of a two-byte form of the second prefix 1601(B). In one example, a format field 2001 (byte 0 2003) contains the value C5H. In one example, byte 1 2005 includes an "R" value in bit[7]. This value is the complement of the "R" value of the first prefix 1601(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 1746 to encode the instruction operand that references a memory address or encode either the destination register operand or a source register operand.

Instructions that use this prefix may use the MOD R/M reg field 1744 to encode either the destination register operand or a source register operand, or to be treated as an opcode extension and not used to encode any instruction operand.

For instruction syntax that support four operands, vvvv, the MOD R/M R/M field 1746 and the MOD R/M reg field 1744 encode three of the four operands. Bits[7:4] of the immediate value field 1609 are then used to encode the third source register operand.

FIG. 20B illustrates examples of a three-byte form of the second prefix 1601(B). In one example, a format field 2011 (byte 0 2013) contains the value C4H. Byte 1 2015 includes in bits[7:5] "R," "X," and "B" which are the complements of the same values of the first prefix 1601(A). Bits[4:0] of byte 1 2015 (shown as mmmmm) include content to encode, as needed, one or more implied leading opcode bytes. For example, 00001 implies a 0FH leading opcode, 00010 implies a 0F38H leading opcode, 00011 implies a 0F3AH leading opcode, etc.

Bit[7] of byte 2 2017 is used similar to W of the first prefix 1601(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 1746 to encode the instruction operand that references a memory address or encode either the destination register operand or a source register operand.

Instructions that use this prefix may use the MOD R/M reg field 1744 to encode either the destination register operand or a source register operand, or to be treated as an opcode extension and not used to encode any instruction operand.

For instruction syntax that support four operands, vvvv, the MOD R/M R/M field 1746, and the MOD R/M reg field 1744 encode three of the four operands. Bits[7:4] of the immediate value field 1609 are then used to encode the third source register operand.

Figure 21:
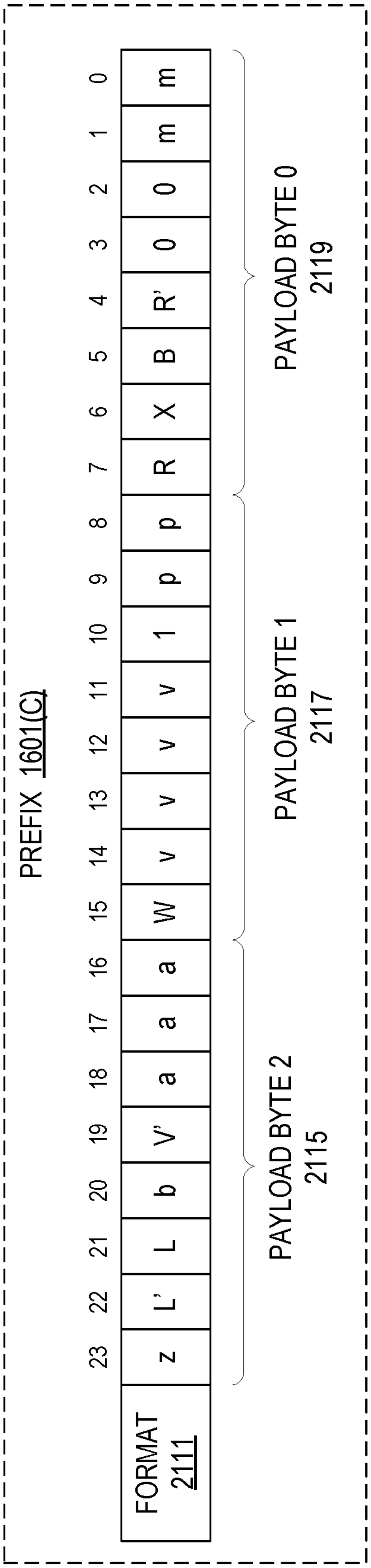
FIG. 21 illustrates examples of a third prefix.

FIG. 21 illustrates examples of a third prefix 1601(C). In some examples, the third prefix 1601(C) is an example of an EVEX prefix. The third prefix 1601(C) is a four-byte prefix.

The third prefix 1601(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 15) or predication utilize this prefix. Opmask register allows for conditional processing or selection control. Opmask instructions, whose source/destination operands are opmask registers and treat the content of an opmask register as a single value, are encoded using the second prefix 1601(B).

The third prefix 1601(C) may encode functionality that is specific to instruction classes (e.g., a packed instruction with "loadtop" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1601(C) is a format field 2111 that has a value, in one example, of 62H. Subsequent bytes are referred to as payload bytes 2115-2119 and collectively form a 24-bit value of P[23:0] providing specific capability in the form of one or more fields (detailed herein).

In some examples, P[1:0] of payload byte 2119 are identical to the low two mm bits. P[3:2] are reserved in some examples. Bit P[4] (R') allows access to the high 16 vector register set when combined with P[7] and the MOD R/M reg field 1744. P[6] can also provide access to a high 16 vector register when SIB-type addressing is not needed. P[7:5] consist of R, X, and B which are operand specifier modifier bits for vector register, general purpose register, memory addressing and allow access to the next set of 8 registers beyond the low 8 registers when combined with the MOD R/M register field 1744 and MOD R/M R/M field 1746. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1601(A) and second prefix 1611(B) and may serve as an opcode extension bit or operand size promotion.

P[18:16] specify the index of a register in the opmask (writemask) registers (e.g., writemask/predicate registers 1515). In one example, the specific value aaa=000 has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation); in other one example, preserving the old value of each element of the destination where the corresponding mask bit has a 0. In contrast, when zeroing vector masks allow any set of elements in the destination to be zeroed during the execution of any operation (specified by the base operation and the augmentation operation); in one example, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differ across different classes of instructions and can affect the meaning of the vector length/rounding control specifier field (P[22:21]). P[23] indicates support for merging-writemasking (e.g., when set to 0) or support for zeroing and merging-writemasking (e.g., when set to 1).

Example examples of encoding of registers in instructions using the third prefix 1601(C) are detailed in the following tables.

TABLE 1

32-Register Support in 64-bit Mode

| | 4 | 3 | [2:0] | REG. TYPE | COMMON USAGES |
|---|---|---|---|---|---|
| REG | R' | R | MOD R/M reg | GPR, Vector | Destination or Source |
| VVVV | V' | | vvvv | GPR, Vector | 2nd Source or Destination |
| RM | X | B | MOD R/M R/M | GPR, Vector | 1st Source or Destination |
| BASE | 0 | B | MOD R/M R/M | GPR | Memory addressing |
| INDEX | 0 | X | SIB.index | GPR | Memory addressing |
| VIDX | V' | X | SIB.index | Vector | VSIB memory addressing |

TABLE 2

Encoding Register Specifiers in 32-bit Mode

| | [2:0] | REG. TYPE | COMMON USAGES |
|---|---|---|---|
| REG | MOD R/M reg | GPR, Vector | Destination or Source |
| VVVV | vvvv | GPR, Vector | $2^{nd}$ Source or Destination |
| RM | MOD R/M R/M | GPR, Vector | $1^{st}$ Source or Destination |
| BASE | MOD R/M R/M | GPR | Memory addressing |
| INDEX | SIB.index | GPR | Memory addressing |
| VIDX | SIB.index | Vector | VSIB memory addressing |

TABLE 3

| Opmask Register Specifier Encoding | | | |
|---|---|---|---|
| | [2:0] | REG. TYPE | COMMON USAGES |
| REG | MOD R/M Reg | k0-k7 | Source |
| VVVV | vvvv | k0-k7 | $2^{nd}$ Source |
| RM | MOD R/M R/M | k0-k7 | $1^{st}$ Source |
| {k1} | aaa | k0-k7 | Opmask |

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

One or more aspects of at least one example may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine readable medium and supplied to various customers or manufacturing facilities to load into the fabrication machines that make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products.

Emulation (including binary translation, code morphing, etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 22 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 22 shows a program in a high-level language 2202 may be compiled using a first ISA compiler 2204 to generate first ISA binary code 2206 that may be natively executed by a processor with at least one first ISA core 2216. The processor with at least one first ISA core 2216 represents any processor that can perform substantially the same functions as an Intel® processor with at least one first ISA core by compatibly executing or otherwise processing (1) a substantial portion of the first ISA or (2) object code versions of applications or other software targeted to run on an Intel processor with at least one first ISA core, in order to achieve substantially the same result as a processor with at least one first ISA core. The first ISA compiler 2204 represents a compiler that is operable to generate first ISA binary code 2206 (e.g., object code) that can, with or without additional linkage processing, be executed on the processor with at least one first ISA core 2216. Similarly, FIG. 22 shows the program in the high-level language 2202 may be compiled using an alternative ISA compiler 2208 to generate alternative ISA binary code 2210 that may be natively executed by a processor without a first ISA core 2214. The instruction converter 2212 is used to convert the first ISA binary code 2206 into code that may be natively executed by the processor without a first ISA core 2214. This converted code is not necessarily to be the same as the alternative ISA binary code 2210; however, the converted code will accomplish the general operation and be made up of instructions from the alternative ISA. Thus, the instruction converter 2212 represents software, firmware, hardware, or a combination thereof that, through emulation, simulation, or any other process, allows a processor or other electronic device that does not have a first ISA processor or core to execute the first ISA binary code 2206.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e. A and B, A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
- a capability management circuit to check a capability for a memory access request for a memory, the capability comprising an address field for an address to be accessed by the memory access request and a bounds field that is to indicate a lower bound and an upper bound of an address space to which the capability authorizes access;
- a decoder circuit to decode a single instruction into a decoded single instruction, the single instruction comprising a field to indicate the capability, and an opcode to indicate:
  - an operation to be performed for the address,
  - that an execution circuit is to perform a first check that a condition code, that indicates a status from a previous execution of the execution circuit, is a certain value,
  - that the capability management circuit is to perform a second check that the capability authorizes access to the address, and
  - in response to the first check and the second check both passing, cause the execution circuit to perform the operation for the address; and
- the execution circuit to execute the decoded single instruction according to the opcode.

2. The apparatus of claim 1, wherein the single instruction comprises a second field that indicates a flag register to store the condition code that indicates the status from the previous execution of the execution circuit.

3. The apparatus of claim 1, wherein the opcode indicates the certain value.

4. The apparatus of claim 1, wherein the execution circuit is to, in response to the first check indicating that the status is not the certain value, cause the single instruction to fault.

5. The apparatus of claim 1, wherein the execution circuit is to, in response to a third check indicating that a validity tag of the capability is not set, cause the single instruction to fault.

6. The apparatus of claim 1, wherein the first check of the condition code is performed before the second check is performed by the capability management circuit.

7. The apparatus of claim 6, wherein the execution circuit is to, in response to the first check indicating that the status is not the certain value, cause the single instruction to fault before the second check is performed by the capability management circuit.

8. A method comprising:
- decoding, by a decoder circuit of a processor, a single instruction into a decoded single instruction, the single instruction comprising:
  - a field to indicate a capability for a memory access request for a memory, the capability comprising an address field for an address to be accessed by the memory access request and a bounds field that is to indicate a lower bound and an upper bound of an address space to which the capability authorizes access, and
  - an opcode to indicate:
    - an operation to be performed for the address,
    - that an execution circuit of the processor is to perform a first check that a condition code, that indicates a status from a previous execution of the execution circuit, is a certain value,
    - that a capability management circuit of the processor is to perform a second check that the capability authorizes access to the address, and
    - in response to the first check and the second check both passing, cause the execution circuit to perform the operation for the address; and
- executing, by the execution circuit, the decoded single instruction according to the opcode.

9. The method of claim 8, wherein the single instruction comprises a second field that indicates a flag register to store the condition code that indicates the status from the previous execution of the execution circuit.

10. The method of claim 8, wherein the opcode indicates the certain value.

11. The method of claim 8, wherein the executing is to, in response to the first check indicating that the status is not the certain value, cause the single instruction to fault.

12. The method of claim 8, wherein the executing is to, in response to a third check indicating that a validity tag of the capability is not set, cause the single instruction to fault.

13. The method of claim 8, wherein the first check of the condition code is performed before the second check is performed by the capability management circuit.

14. The method of claim 13, wherein the executing is to, in response to the first check indicating that the status is not the certain value, cause the single instruction to fault before the second check is performed by the capability management circuit.

15. A non-transitory machine-readable medium that stores code that when executed by a machine causes the machine to perform a method comprising:
- decoding, by a decoder circuit of a processor, a single instruction into a decoded single instruction, the single instruction comprising:
  - a field to indicate a capability for a memory access request for a memory, the capability comprising an address field for an address to be accessed by the memory access request and a bounds field that is to indicate a lower bound and an upper bound of an address space to which the capability authorizes access, and
  - an opcode to indicate:
    - an operation to be performed for the address,
    - that an execution circuit of the processor is to perform a first check that a condition code, that indicates a status from a previous execution of the execution circuit, is a certain value,
    - that a capability management circuit of the processor is to perform a second check that the capability authorizes access to the address, and
    - in response to the first check and the second check both passing, cause the execution circuit to perform the operation for the address; and
- executing, by the execution circuit, the decoded single instruction according to the opcode.

16. The non-transitory machine-readable medium of claim 15, wherein the single instruction comprises a second field that indicates a flag register to store the condition code that indicates the status from the previous execution of the execution circuit.

17. The non-transitory machine-readable medium of claim 15, wherein the opcode indicates the certain value.

18. The non-transitory machine-readable medium of claim 15, wherein the executing is to, in response to the first check indicating that the status is not the certain value, cause the single instruction to fault.

19. The non-transitory machine-readable medium of claim 15, wherein the first check of the condition code is performed before the second check is performed by the capability management circuit.

20. The non-transitory machine-readable medium of claim 19, wherein the executing is to, in response to the first check indicating that the status is not the certain value, cause the single instruction to fault before the second check is performed by the capability management circuit.

* * * * *